United States Patent
Tsai et al.

(10) Patent No.: US 8,810,921 B1
(45) Date of Patent: Aug. 19, 2014

(54) IMAGE CAPTURING LENS SYSTEM

(71) Applicant: Largan Precision Co., Ltd., Taichung (TW)

(72) Inventors: Tsung-Han Tsai, Taichung (TW); Chun-Che Hsueh, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/899,015

(22) Filed: May 21, 2013

(30) Foreign Application Priority Data

Apr. 12, 2013 (TW) ............... 102113027 A

(51) Int. Cl.
*G02B 13/00* (2006.01)
*G02B 13/18* (2006.01)
*H04N 5/225* (2006.01)

(52) U.S. Cl.
CPC .......... G02B 13/0045 (2013.01); H04N 5/2254 (2013.01)
USPC ......................................... 359/714; 348/340

(58) Field of Classification Search
CPC ................. G02B 13/0045; H04N 5/2254
USPC .......................................... 348/340; 359/714
See application file for complete search history.

(56) References Cited

U.S. PATENT DOCUMENTS

| 8,169,528 | B2 | 5/2012 | Chen et al. | |
|---|---|---|---|---|
| 8,189,273 | B2 | 5/2012 | Noda | |
| 8,482,863 | B2 * | 7/2013 | Tsai et al. | 359/714 |
| 8,654,242 | B2 * | 2/2014 | Matsusaka et al. | 348/345 |
| 2013/0258164 | A1 * | 10/2013 | Chang et al. | 348/345 |
| 2013/0258185 | A1 * | 10/2013 | Chang et al. | 348/374 |
| 2014/0104700 | A1 * | 4/2014 | Chang et al. | 359/714 |
| 2014/0104701 | A1 * | 4/2014 | Jung et al. | 359/714 |

* cited by examiner

*Primary Examiner* — David N Spector
(74) *Attorney, Agent, or Firm* — Morris Manning & Martin LLP; Tim Tingkang Xia, Esq.

(57) ABSTRACT

An image capturing lens system includes, in order from an object side to an image side, a first lens element, a second lens element, a third lens element, a fourth lens element and a fifth lens element. The first lens element has positive refractive power. The second lens element with positive refractive power has a convex object-side surface. The third lens element has negative refractive power. The fourth lens element with positive refractive power has a convex image-side surface. The fifth lens element with negative refractive power has a concave image-side surface, wherein both of an object-side surface and the image-side surface of the fifth lens element are aspheric, and at least one inflection point is formed on at least one of the object-side surface and the image-side surface of the fifth lens element. The image capturing lens system has a total of five lens elements with refractive power.

23 Claims, 14 Drawing Sheets

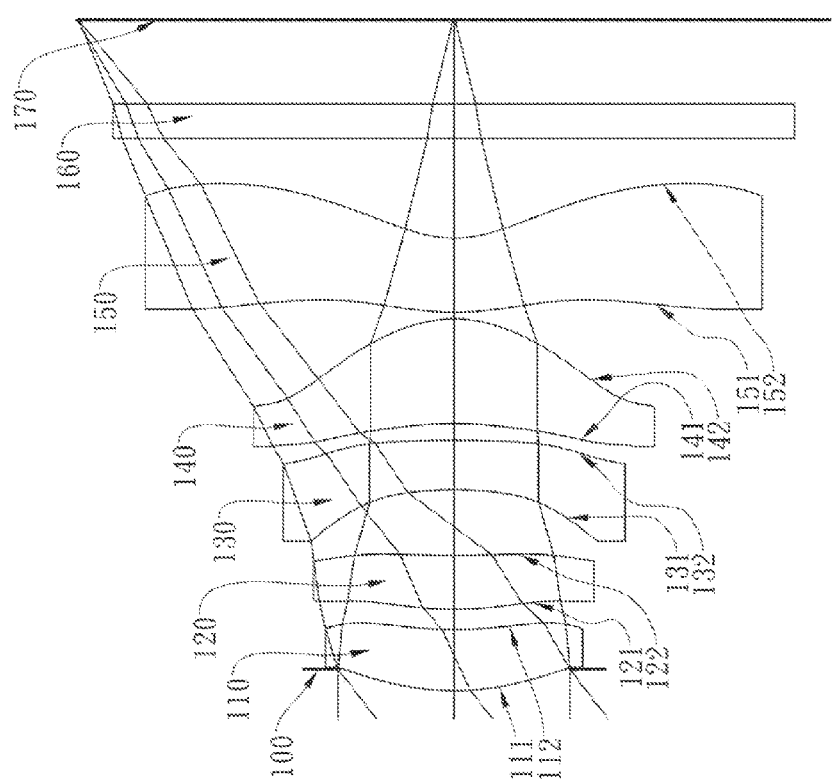

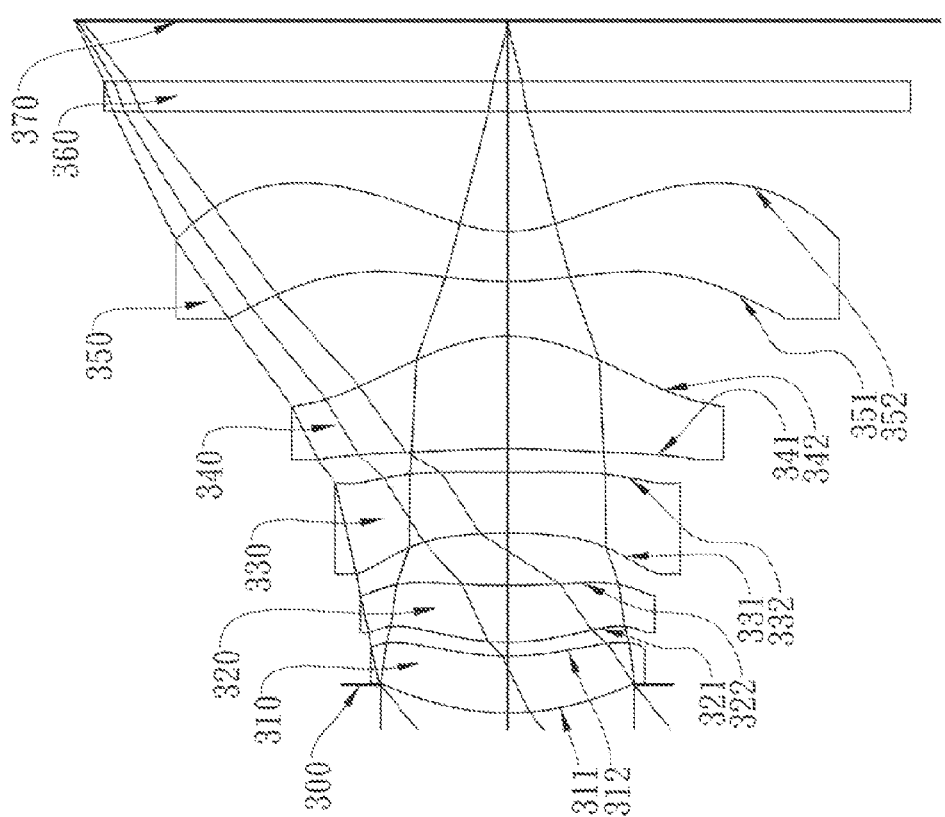

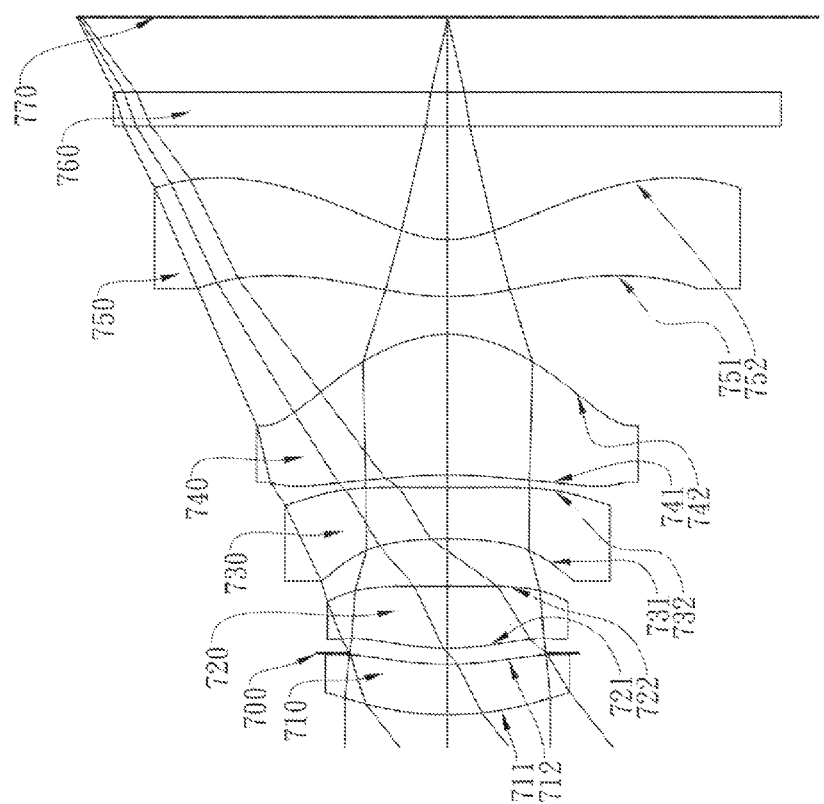

IMAGE CAPTURING LENS SYSTEM

RELATED APPLICATIONS

The application claims priority to Taiwan Application Serial Number 102113027, filed on Apr. 12, 2013, which is herein incorporated by reference.

BACKGROUND

1. Technical Field

The present disclosure relates to an image capturing lens system. More particularly, the present disclosure relates to a compact image capturing lens system applicable to the electronic products.

2. Description of Related Art

In recent years, with the popularity of mobile products having camera functionalities, the demand of miniaturized optical systems has been increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional compact optical system employed in a portable electronic product mainly adopts a structure of four-element lens such as the one disclosed in the U.S. Pat. No. 8,169,528. Due to the popularity of mobile products with high-end specifications, such as smart phones and PDAs (Personal Digital Assistants), the requirements for high resolution and image quality of modern compact optical systems have been increasing significantly. However, the conventional four-element lens structure cannot satisfy these requirements of the compact optical system.

Although other conventional optical systems with five-element lens structure such as the one disclosed in the U.S. Pat. No. 8,189,273 enhances image quality; however, the refractive power of this optical system is not proper distributed for every lens element. It thereby results into more aberration and is more sensitive to the variations of manufacturing processes. Given that the requirements for higher megapixels and better image quality have been increasing, the manufacturing yield rate of this optical system might be low.

SUMMARY

According to one aspect of the present disclosure, an image capturing lens system includes, in order from an object side to an image side, a first lens element, a second lens element, a third lens element, a fourth lens element and a fifth lens element. The first lens element has positive refractive power. The second lens element with positive refractive power has a convex object-side surface. The third lens element has negative refractive power. The fourth lens element with positive refractive power has a convex image-side surface. The fifth lens element with negative refractive power has a concave image-side surface, wherein both of an object-side surface and the image-side surface of the fifth lens element are aspheric, and at least one inflection point is formed on at least one of the object-side surface and the image-side surface of the fifth lens element. The image capturing lens system has a total of five lens elements with refractive power. When an axial distance between the second lens element and the third lens element is T23, a central thickness of the second lens element is CT2, a focal length of the second lens element is f2, a curvature radius of the object-side surface of the second lens element is R3, a curvature radius of the object-side surface of the fifth lens element is R9, and a curvature radius of the image-side surface of the fifth lens element is R10, the following relationships are satisfied:

$0.75 < T23/CT2 < 3.0;$ $2.0 < f2/R3 < 15.0;$ and $0 < (R9+R10)/(R9-R10).$

According to another aspect of the present disclosure, an image capturing lens system includes, in order from an object side to an image side, a first lens element, a second lens element, a third lens element, a fourth lens element and a fifth lens element. The first lens element with positive refractive power has a convex object-side surface. The second lens element with positive refractive power has a convex object-side surface. The third lens element has negative refractive power. The fourth lens element with positive refractive power has a concave object-side surface and a convex image-side surface. The fifth lens element with negative refractive power has a concave image-side surface, wherein both of an object-side surface and the image-side surface of the fifth lens element are aspheric, and at least one inflection point is formed on at least one of the object-side surface and the image-side surface of the fifth lens element. The image capturing lens system has a total of five lens elements with refractive power. When an axial distance between the second lens element and the third lens element is T23, a central thickness of the second lens element is CT2, a focal length of the second lens element is f2, and a curvature radius of the object-side surface of the second lens element is R3, the following relationships are satisfied:

$0.75 < T23/CT2 < 3.0;$ $2.0 < f2/R3.$

BRIEF DESCRIPTION OF THE DRAWINGS

The disclosure can be more fully understood by reading the following detailed description of the embodiment, with reference made to the accompanying drawings as follows:

FIG. 1A is a schematic view of an image capturing lens system according to the 1st embodiment of the present disclosure;

FIG. 3A is a schematic view of an image capturing lens system according to the 3rd embodiment of the present disclosure;

FIG. 7A is a schematic view of an image capturing lens system according to the 7th embodiment of the present disclosure.

DETAILED DESCRIPTION

Figure 1B:
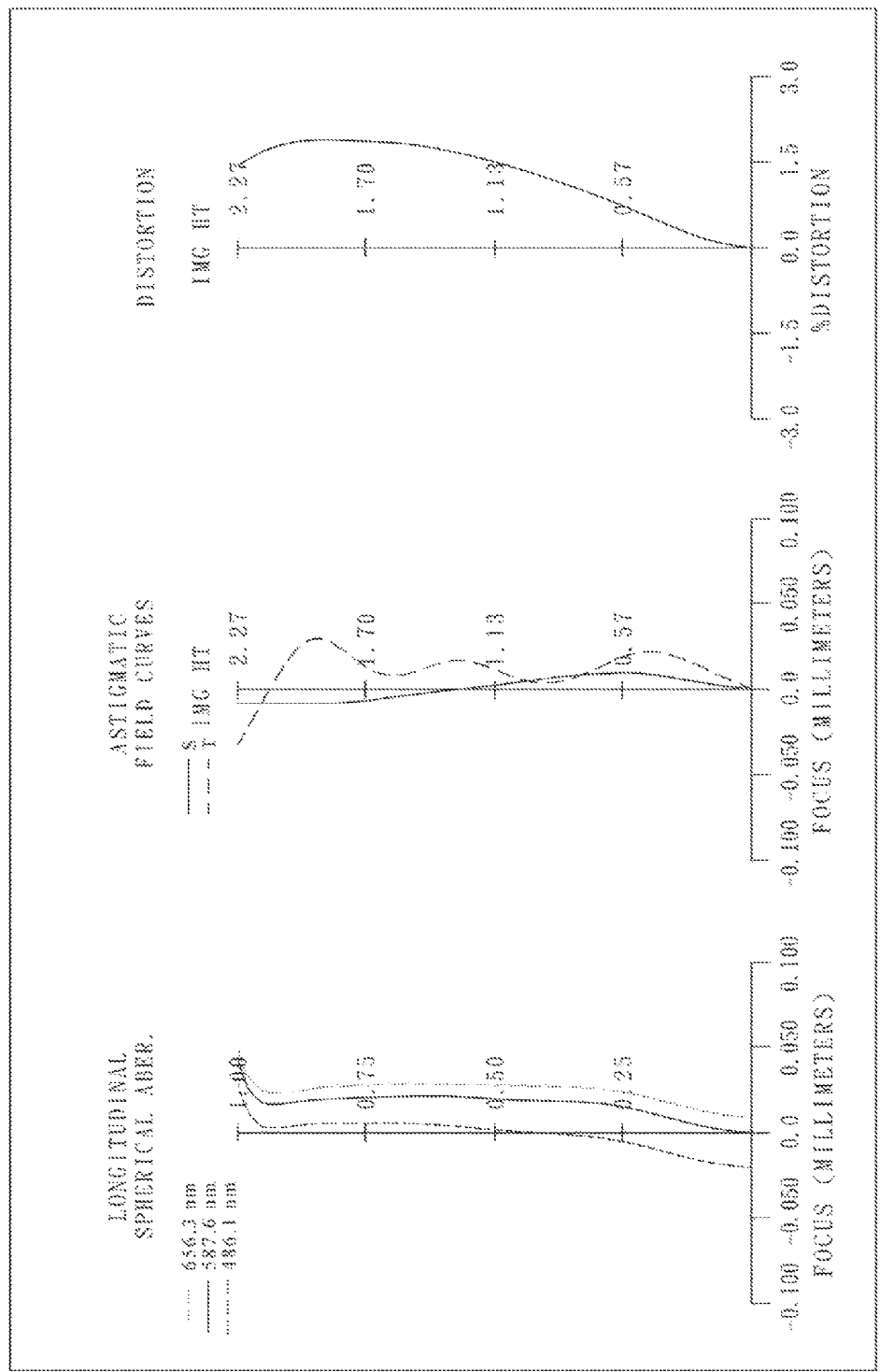
FIG. 1B shows spherical aberration curves, astigmatic field curves and a distortion curve of the image capturing lens system according to the 1st embodiment.

An image capturing lens system includes, in order from an object side to an image side, a first lens element, a second lens element, a third lens element, a fourth lens element and a fifth lens element. The image capturing lens system has a total of five lens elements with refractive power.

The first lens element has positive refractive power, so that it provides the image capturing lens system with the positive refractive power as it needs to be which is favorable for reducing the total track length of the image capturing lens system. The first lens element can have a convex object-side surface and a concave image-side surface, so that it is favorable for adjusting the total track length. At least one inflection point is formed on the image-side surface of the first lens element which is favorable for effectively correcting the aberration of the off-axis.

The second lens element with positive refractive power can avoid overloading the positive refractive power on one single lens element, so that it is favorable for effectively reducing spherical aberration and sensitivity so as to increase yield rate. The second lens element has a convex object-side surface and can have a concave image-side surface which is favorable for correcting astigmatism.

The third lens element with negative refractive power can correct the aberration generated from the first lens element and the second lens element. The third lens element can have a concave object-side surface, so that it is favorable for further correcting the aberration.

The fourth lens element has positive refractive power, so that it is favorable for reducing the spherical aberration. The fourth lens element can have a concave object-side surface and has a convex image-side surface, so that the astigmatism of the image capturing lens system can be further corrected.

The fifth lens element has negative refractive power, so that it is favorable for effectively correcting the Petzval sum to make the image plane more flat. The fifth lens element can have a convex object-side surface and has a concave image-side surface, so that the principal point can be positioned away from the image plane. It is favorable for reducing the back focal length so as to keep the image capturing lens system a compact size. At least one inflection point is formed on at least one of the object-side surface and the image-side surface, so that the incident angle of the off-axis on the image plane can be reduced for increasing the responding rate of an image sensor so as to further correct the aberration of the off-axis.

When an axial distance between the second lens element and the third lens element is T23, and a central thickness of the second lens element is CT2, the following relationship is satisfied: $0.75 < T23/CT2 < 3.0$. Therefore, it is favorable for assembling the lens elements and improving the moldability during the injection molding process. Preferably, the following relationship is satisfied: $0.75 < T23/CT2 < 1.5$.

When a focal length of the second lens element is f2, and a curvature radius of the object-side surface of the second lens element is R3, the following relationship is satisfied: $2.0 < f2/R3$. Therefore, it is favorable for reducing the system sensitivity so as to increase the manufacturing yield rate. Preferably, the following relationship is satisfied: $2.0 < f2/R3 < 15.0$. More preferably, the following relationship is satisfied: $2.0 < f2/R3 < 5.0$.

When a curvature radius of the object-side surface of the fifth lens element is R9, and a curvature radius of the image-side surface of the fifth lens element is R10, the following relationship is satisfied: $0 < (R9+R10)/(R9-R10)$. Therefore, it is favorable for reducing the astigmatism of the image capturing lens system. Preferably, the following relationship is satisfied: $0.8 < (R9+R10)/(R9-R10) < 5.0$.

When an Abbe number of the second lens element is V2, and an Abbe number of the third lens element is V3, the following relationship is satisfied: $1.5 < V2/V3 < 3.0$. Therefore, the chromatic aberration of the image capturing lens system can be corrected.

When a focal length of the first lens element is f1, the focal length of the second lens element is f2, a focal length of the third lens element is f3, and a focal length of the fourth lens element is f4, the following relationship is satisfied: $0.75 < (f4/f1)+(f4/f2)+|f4/f3| < 1.5$. Therefore, it provides every lens element of the image capturing lens system with the evenly distributed refractive power as it needs to be. It is favorable for reducing the sensitivity of the image capturing lens system to the manufacturing variations resulted from the curvature radius or central thickness of the lens elements so as to effectively increase the manufacturing yield rate.

When a curvature radius of the object-side surface of the third lens element is R5, and a curvature radius of the image-side surface of the third lens element is R6, the following relationship is satisfied: $-2.5 < (R5+R6)/(R5-R6) < 0.5$. Therefore, it is favorable for reducing the aberration.

When the focal length of the first lens element is f1, and the focal length of the second lens element is f2, the following relationship is satisfied: $0 < f2/f1 < 0.90$. Therefore, it is favorable for balancing the distribution of refractive power for the first lens element and the second lens element. It is thereby favorable for correcting the spherical aberration of the image capturing lens system so as to improve its resolving power.

When a focal length of the image capturing lens system is f, and a composite focal length of the second lens element and the third lens element is f23, the following relationship is satisfied: $0 < f/f23 < 0.5$. Therefore, it is favorable for reducing the aberration.

When the focal length of the third lens element is f3, and the focal length of the second lens element is f2, the following relationship is satisfied: $-1.50 < f3/f2 < -0.70$. Therefore, it is favorable for reducing the spherical aberration and the astigmatism.

When the focal length of the image capturing lens system is f, and the focal length of the second lens element is f2, the following relationship is satisfied: $0.5 < f/f2 < 1.0$. Therefore, it is favorable for reducing the manufacturing sensitivity.

According to the image capturing lens system of the present disclosure, the lens elements thereof can be made of glass or plastic material. When the lens elements are made of glass material, the distribution of the refractive power of the image capturing lens system may be more flexible to design. When the lens elements are made of plastic material, the manufacturing cost can be effectively reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Therefore, the total track length of the image capturing lens system can also be reduced.

According to the image capturing lens system of the present disclosure, each of an object-side surface and an image-side surface of every lens element has a paraxial region thereof and a peripheral region thereof. The paraxial region thereof refers to the region of the surface where light rays travel close to an optical axis and the peripheral region thereof refers to the region of the surface where light rays travel away from the optical axis. Particularly, when the lens element has a convex surface, it indicates that the surface is convex at the paraxial region thereof; and when the lens element has a concave surface, it indicates that the surface is concave at the paraxial region thereof.

According to the image capturing lens system of the present disclosure, the optical image lens system can include at least one stop, such as an aperture stop, a glare stop, or a field stop, etc.

According to the image capturing lens system of the present disclosure, the image capturing lens system is featured with good correction ability and high image quality, and can be applied to 3D (three-dimensional) image capturing applications, in products such as digital cameras, mobile devices and tablets.

According to the above description of the present disclosure, the following 1st-7th specific embodiments are provided for further explanation.

1st Embodiment

FIG. 1A is a schematic view of an image capturing lens system according to the 1st embodiment of the present disclosure. FIG. 1B shows spherical aberration curves, astigmatic field curves and a distortion curve of the image capturing lens system according to the 1st embodiment. In FIG. 1A, the image capturing lens system includes, in order from an object side to an image side, an aperture stop 100, a first lens element 110, a second lens element 120, a third lens element 130, a fourth lens element 140, a fifth lens element 150, an IR-cut filter 160 and an image plane 170. The image capturing lens system has a total of five lens elements (110-150) with refractive power.

The first lens element 110 with positive refractive power has a convex object-side surface 111 and a concave image-side surface 112, and is made of plastic material. The object-side surface 111 and the image-side surface 112 of the first lens element 110 are aspheric. Furthermore, the image-side surface 112 of the first lens element 110 has at least one inflection point.

The second lens element 120 with positive refractive power has a convex object-side surface 121 and a concave image-side surface 122, and is made of plastic material. The object-side surface 121 and the image-side surface 122 of the second lens element 120 are aspheric.

The third lens element 130 with negative refractive power has a concave object-side surface 131 and a convex image-side surface 132, and is made of plastic material. The object-side surface 131 and the image-side surface 132 of the third lens element 130 are aspheric.

The fourth lens element 140 with positive refractive power has a concave object-side surface 141 and a convex image-side surface 142, and is made of plastic material. The object-side surface 141 and the image-side surface 142 of the fourth lens element 140 are aspheric.

The fifth lens element 150 with negative refractive power has a convex object-side surface 151 and a concave image-side surface 152, and is made of plastic material. The object-side surface 151 and the image-side surface 152 of the fifth lens element 150 are aspheric. Furthermore, both of the object-side surface 151 and the image-side surface 152 of the fifth lens element 150 have at least one inflection point.

The IR-cut filter 160 is made of glass and located between the fifth lens element 150 and the image plane 170, and will not affect the focal length of the image capturing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing lens system according to the 1st embodiment, a focal length of the image capturing lens system is f, an f-number of the image capturing lens system is Fno, and half of the maximal field of view of the image capturing lens system is HFOV; these parameters have the following values: f=2.91 mm; Fno=2.08; and HFOV=37.5 degrees.

In the image capturing lens system according to the 1st embodiment, an Abbe number of the second lens element 120 is V2, and an Abbe number of the third lens element 130 is V3; the following relationship is satisfied: V2/V3=2.40.

In the image capturing lens system according to the 1st embodiment, an axial distance between the second lens element 120 and the third lens element 130 is T23, and a central thickness of the second lens element 120 is CT2; the following relationship is satisfied: T23/CT2=1.21.

In the image capturing lens system according to the 1st embodiment, a curvature radius of the object-side surface 131 of the third lens element 130 is R5, and a curvature radius of the image-side surface 132 of the third lens element 130 is R6; the following relationship is satisfied: (R5+R6)/(R5−R6)=−1.66.

In the image capturing lens system according to the 1st embodiment, a curvature radius of the object-side surface 151 of the fifth lens element 150 is R9, and a curvature radius of the image-side surface 152 of the fifth lens element 150 is R10; the following relationship is satisfied: (R9+R10)/(R9−R10)=2.36.

In the image capturing lens system according to the 1st embodiment, a focal length of the first lens element 110 is f1, and a focal length of the second lens element 120 is f2; the following relationship is satisfied: f2/f1=0.65.

In the image capturing lens system according to the 1st embodiment, a focal length of the second lens element 120 is f2, and a curvature radius of the object-side surface 121 of the second lens element 120 is R3; the following relationship is satisfied: f2/R3=2.46.

In the image capturing lens system according to the 1st embodiment, a focal length of the image capturing lens system is f, and a focal length of the second lens element 120 is f2; the following relationship is satisfied: f/f2=0.58.

In the image capturing lens system according to the 1st embodiment, a focal length of the image capturing lens system is f, and a composite focal length of the second lens element 120 and the third lens element 130 is f23; the following relationship is satisfied: f/f23=0.13.

In the image capturing lens system according to the 1st embodiment, a focal length of the third lens element 130 is f3, and a focal length of the second lens element 120 is f2; the following relationship is satisfied: f3/f2=−1.12.

In the image capturing lens system according to the 1st embodiment, a focal length of the first lens element 110 is f1, a focal length of the second lens element 120 is f2, a focal length of the third lens element 130 is f3, and a focal length of the fourth lens element 140 is f4; the following relationship is satisfied: (f4/f1)+(f4/f2)+|f4+f3|=0.94.

The detailed optical data of the 1st embodiment are shown in Table 1 and the aspheric surface data are shown in Table 2 below.

TABLE 1

1st Embodiment
f = 2.91 mm, Fno = 2.08, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.130 | | | | |
| 2 | Lens 1 | 1.548 | ASP | 0.369 | Plastic | 1.544 | 55.9 | 7.72 |
| 3 | | 2.246 | ASP | 0.122 | | | | |
| 4 | Lens 2 | 2.025 | ASP | 0.326 | Plastic | 1.544 | 55.9 | 4.98 |
| 5 | | 7.549 | ASP | 0.395 | | | | |
| 6 | Lens 3 | −2.632 | ASP | 0.299 | Plastic | 1.640 | 23.3 | −5.56 |
| 7 | | −10.586 | ASP | 0.101 | | | | |
| 8 | Lens 4 | −2.299 | ASP | 0.630 | Plastic | 1.544 | 55.9 | 1.84 |
| 9 | | −0.765 | ASP | 0.040 | | | | |
| 10 | Lens 5 | 1.628 | ASP | 0.447 | Plastic | 1.544 | 55.9 | −2.43 |
| 11 | | 0.658 | ASP | 0.600 | | | | |
| 12 | IR-cut filter | Plano | | 0.210 | Glass | 1.517 | 64.2 | — |
| 13 | | Plano | | 0.506 | | | | |
| 14 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k = | −8.3697E+00 | −1.0000E+00 | −5.0516E−01 | 6.2499E+00 | −1.6416E+01 |
| A4 = | 1.9712E−01 | −1.9623E−01 | −1.8535E−01 | −1.0711E−01 | −3.9834E−01 |
| A6 = | 7.6942E−03 | −7.3631E−02 | −6.3695E−02 | −3.8814E−01 | −6.0927E−01 |
| A8 = | −3.0998E+00 | 3.0241E+00 | 2.3473E+00 | 1.1084E+00 | 2.3937E+00 |
| A10 = | 1.5929E+01 | −9.9327E+00 | −8.9043E+00 | −4.3737E+00 | −8.7437E+00 |
| A12 = | −4.2524E+01 | 1.6669E+01 | 1.7761E+01 | 1.0797E+01 | 2.3195E+01 |
| A14 = | 5.7294E+01 | −1.1527E+01 | −1.3797E+01 | −1.1725E+01 | −2.8714E+01 |
| A16 = | −3.1203E+01 | 1.5444E+00 | 2.8006E+00 | 4.6723E+00 | 1.2992E+01 |

| Surface # | 7 | 8 | 9 | 10 | 11 |
|---|---|---|---|---|---|
| k = | 6.2306E+01 | 6.5410E−01 | −3.5244E+00 | −2.7934E−01 | −4.0335E+00 |
| A4 = | −1.2739E−01 | 1.3990E−01 | −3.1322E−01 | −4.8125E−01 | −2.1330E−01 |
| A6 = | 6.1926E−01 | 1.1181E+00 | 4.4442E−01 | 3.3483E−01 | 1.7834E−01 |
| A8 = | −4.0189E+00 | −6.3056E+00 | −4.7095E−01 | −1.6646E−01 | −1.1020E−01 |
| A10 = | 9.0409E+00 | 1.3240E+01 | 1.5607E−01 | 6.3835E−02 | 4.6072E−02 |
| A12 = | −9.2392E+00 | −1.3684E+01 | 3.6547E−01 | −1.9696E−02 | −1.2181E−02 |
| A14 = | 4.4608E+00 | 7.0892E+00 | −3.4147E−01 | 4.1469E−03 | 1.8141E−03 |
| A16 = | −8.1525E−01 | −1.4871E+00 | 8.0665E−02 | −4.2090E−04 | −1.1570E−04 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 2A:
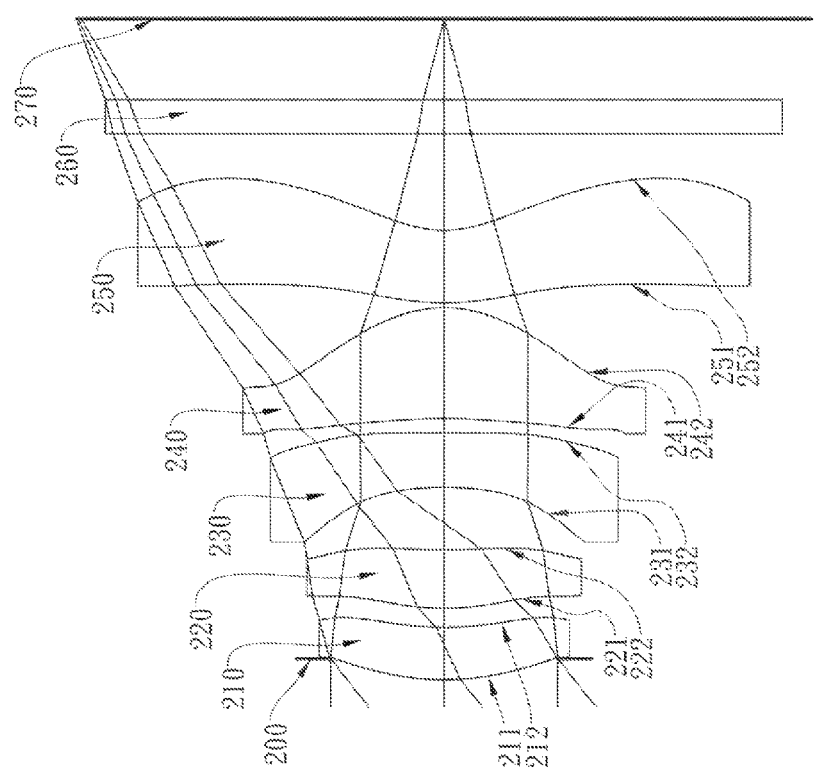
FIG. 2A is a schematic view of an image capturing lens system according to the 2nd embodiment of the present disclosure.
Figure 2B:
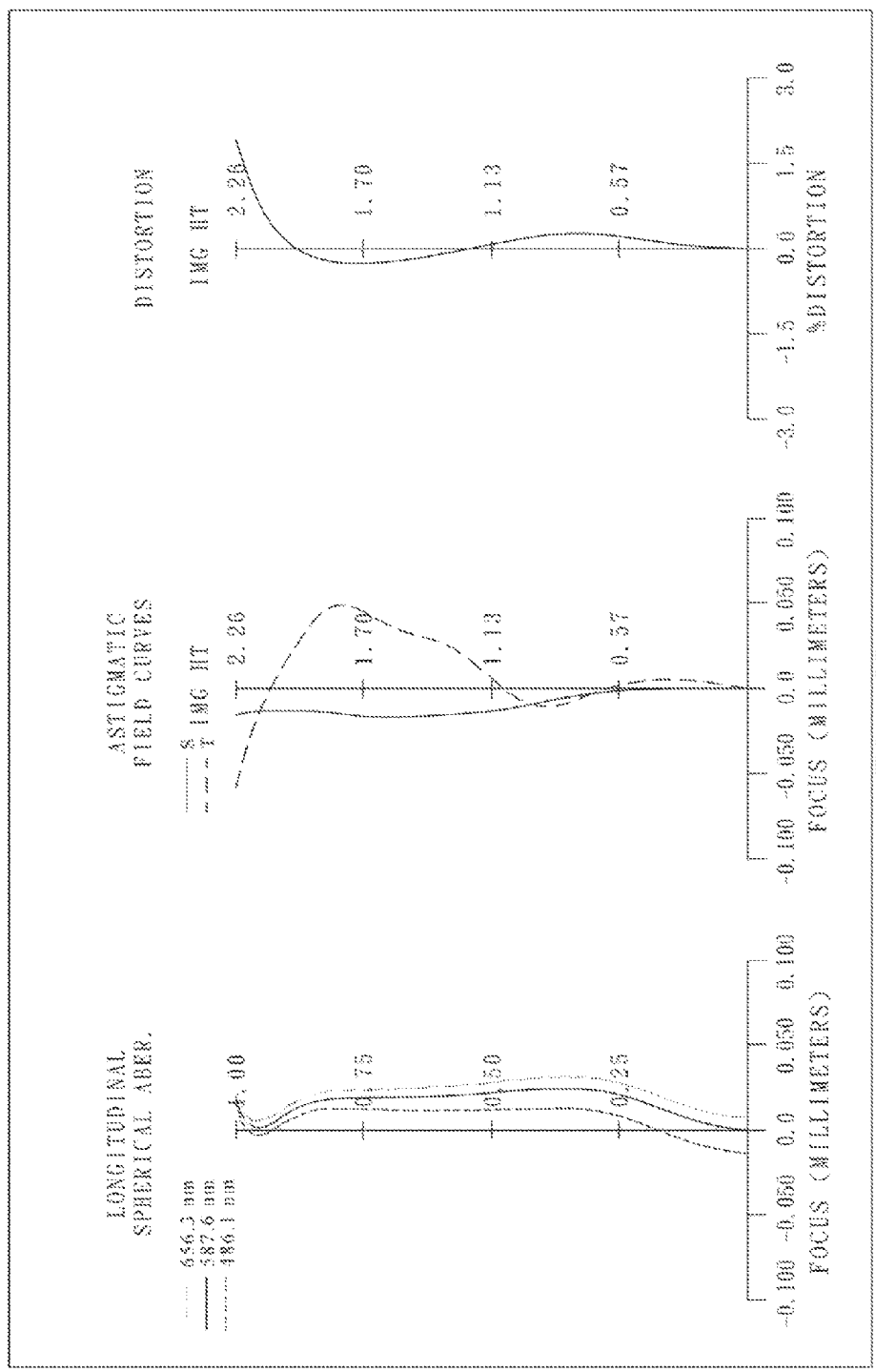
FIG. 2B shows spherical aberration curves, astigmatic field curves and a distortion curve of the image capturing lens system according to the 2nd embodiment.

FIG. 2A is a schematic view of an image capturing lens system according to the 2nd embodiment of the present disclosure. FIG. 2B shows spherical aberration curves, astigmatic field curves and a distortion curve of the image capturing lens system according to the 2nd embodiment. In FIG. 2A, the image capturing lens system includes, in order from an object side to an image side, an aperture stop 200, a first lens element 210, a second lens element 220, a third lens element 230, a fourth lens element 240, a fifth lens element 250, an IR-cut filter 260 and an image plane 270. The image capturing lens system has a total of five lens elements (210-250) with refractive power.

The first lens element 210 with positive refractive power has a convex object-side surface 211 and a concave image-side surface 212, and is made of plastic material. The object-side surface 211 and the image-side surface 212 of the first lens element 210 are aspheric. Furthermore, the image-side surface 212 of the first lens element 210 has at least one inflection point.

The second lens element 220 with positive refractive power has a convex object-side surface 221 and a concave image-side surface 222, and is made of plastic material. The object-side surface 221 and the image-side surface 222 of the second lens element 220 are aspheric.

The third lens element 230 with negative refractive power has a concave object-side surface 231 and a convex image-side surface 232, and is made of plastic material. The object-side surface 231 and the image-side surface 232 of the third lens element 230 are aspheric.

The fourth lens element 240 with positive refractive power has a concave object-side surface 241 and a convex image-side surface 242, and is made of plastic material. The object-side surface 241 and the image-side surface 242 of the fourth lens element 240 are aspheric.

The fifth lens element 250 with negative refractive power has a convex object-side surface 251 and a concave image-side surface 252, and is made of plastic material. The object-side surface 251 and the image-side surface 252 of the fifth lens element 250 are aspheric. Furthermore, both of the object-side surface 251 and the image-side surface 252 of the fifth lens element 250 have at least one inflection point.

The IR-cut filter 260 is made of glass and located between the fifth lens element 250 and the image plane 270, and will not affect the focal length of the image capturing lens system.

The detailed optical data of the 2nd embodiment are shown in Table 3 and the aspheric surface data are shown in Table 4 below.

TABLE 3

2nd Embodiment
f = 2.82 mm, Fno = 2.00, HFOV = 38.2 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.130 |  |  |  |  |
| 2 | Lens 1 | 1.581 | ASP | 0.326 | Plastic | 1.565 | 56.5 | 18.12 |
| 3 |  | 1.730 | ASP | 0.119 |  |  |  |  |
| 4 | Lens 2 | 1.546 | ASP | 0.365 | Plastic | 1.565 | 56.5 | 3.46 |
| 5 |  | 6.734 | ASP | 0.385 |  |  |  |  |
| 6 | Lens 3 | −2.286 | ASP | 0.340 | Plastic | 1.639 | 23.5 | −3.67 |
| 7 |  | −100.000 | ASP | 0.089 |  |  |  |  |
| 8 | Lens 4 | −3.248 | ASP | 0.686 | Plastic | 1.535 | 55.7 | 1.68 |
| 9 |  | −0.757 | ASP | 0.030 |  |  |  |  |
| 10 | Lens 5 | 1.519 | ASP | 0.450 | Plastic | 1.535 | 55.7 | −2.62 |
| 11 |  | 0.654 | ASP | 0.600 |  |  |  |  |
| 12 | IR-cut filter | Plano |  | 0.210 | Glass | 1.517 | 64.2 | — |
| 13 |  | Plano |  | 0.503 |  |  |  |  |
| 14 | Image | Plano |  | — |  |  |  |  |

Note:
Reference wavelength is 587.6 nm (d-line).

TABLE 4

Aspheric Coefficients

| Surface # | 2 | 3 | 4 | 5 | 6 |
|---|---|---|---|---|---|
| k = | −1.0440E+01 | −4.3741E+00 | −2.6811E+00 | −3.0000E+01 | −7.2881E+00 |
| A4 = | 2.0712E−01 | −2.0854E−01 | −1.9881E−01 | −1.2865E−01 | −4.0182E−01 |
| A6 = | 3.6022E−02 | −5.4411E−01 | −4.5914E−01 | −4.0262E−01 | −7.0904E−01 |
| A8 = | −3.1912E+00 | 3.0374E+00 | 2.0855E+00 | 8.1983E−01 | 2.5204E+00 |
| A10 = | 1.6162E+01 | −1.0392E+01 | −9.1799E+00 | −4.1510E+00 | −8.5171E+00 |

TABLE 4-continued

| Aspheric Coefficients | | | | |
|---|---|---|---|---|
| A12 = −4.2613E+01 | 1.7075E+01 | 1.8178E+01 | 1.1192E+01 | 2.3133E+01 |
| A14 = 5.7294E+01 | −1.1527E+01 | −1.3704E+01 | −1.1994E+01 | −2.8987E+01 |
| A16 = −3.1203E+01 | 1.5444E+00 | 2.8006E+00 | 4.6723E+00 | 1.2992E+01 |

| Surface # | 7 | 8 | 9 | 10 | 11 |
|---|---|---|---|---|---|
| k = | 5.0000E+00 | 3.6406E−01 | −3.3924E+00 | −3.5027E−01 | −4.0049E+00 |
| A4 = | −1.3876E−01 | 1.4555E−01 | −3.0319E−01 | −4.4184E−01 | −2.1293E−01 |
| A6 = | 6.3492E−01 | 1.1014E+00 | 4.7908E−01 | 3.1468E−01 | 1.7486E−01 |
| A8 = | −4.0397E+00 | −6.3129E+00 | −4.8775E−01 | −1.6451E−01 | −1.0856E−01 |
| A10 = | 9.0307E+00 | 1.3234E+01 | 1.4841E−01 | 6.4034E−02 | 4.5946E−02 |
| A12 = | −9.2313E+00 | −1.3681E+01 | 3.6668E−01 | −1.9942E−02 | −1.2440E−02 |
| A14 = | 4.4713E+00 | 7.0977E+00 | −3.4095E−01 | 4.1909E−03 | 1.8901E−03 |
| A16 = | −8.3938E−01 | −1.4928E+00 | 8.1853E−02 | −4.1165E−04 | −1.2052E−04 |

In the image capturing lens system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| 2nd Embodiment | | | |
|---|---|---|---|
| f [mm] | 2.82 | f2/f1 | 0.19 |
| Fno | 2.00 | f2/R3 | 2.24 |
| HFOV [deg.] | 38.2 | f/f2 | 0.82 |
| V2/V3 | 2.40 | f/f23 | 0.20 |
| T23/CT2 | 1.05 | f3/f2 | −1.06 |
| (R5 + R6)/(R5 − R6) | −1.05 | (f4/f1) + (f4/f2) + |f4/f3| | 1.04 |
| (R9 + R10)/(R9 − R10) | 2.51 | | |

3rd Embodiment

Figure 3B:
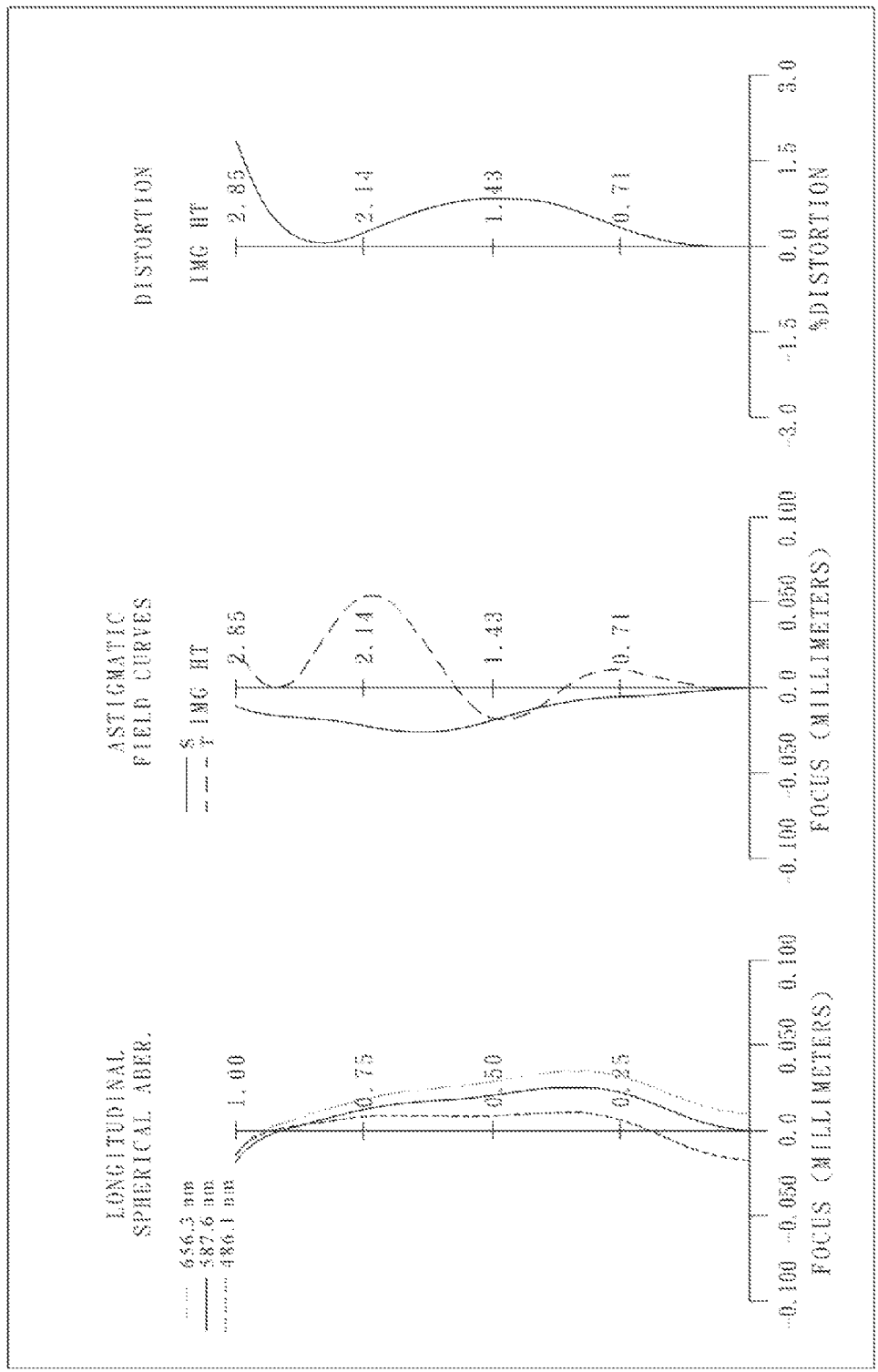
FIG. 3B shows spherical aberration curves, astigmatic field curves and a distortion curve of the image capturing lens system according to the 3rd embodiment.

FIG. 3A is a schematic view of an image capturing lens system according to the 3rd embodiment of the present disclosure. FIG. 3B shows spherical aberration curves, astigmatic field curves and a distortion curve of the image capturing lens system according to the 3rd embodiment. In FIG. 3A, the image capturing lens system includes, in order from an object side to an image side, an aperture stop 300, a first lens element 310, a second lens element 320, a third lens element 330, a fourth lens element 340, a fifth lens element 350, an IR-cut filter 360 and an image plane 370. The image capturing lens system has a total of five lens elements (310-350) with refractive power.

The first lens element 310 with positive refractive power has a convex object-side surface 311 and a concave image-side surface 312, and is made of plastic material. The object-side surface 311 and the image-side surface 312 of the first lens element 310 are aspheric. Furthermore, the image-side surface 312 of the first lens element 310 has at least one inflection point.

The second lens element 320 with positive refractive power has a convex object-side surface 321 and a concave image-side surface 322, and is made of plastic material. The object-side surface 321 and the image-side surface 322 of the second lens element 320 are aspheric.

The third lens element 330 with negative refractive power has a concave object-side surface 331 and a concave image-side surface 332, and is made of plastic material. The object-side surface 331 and the image-side surface 332 of the third lens element 330 are aspheric.

The fourth lens element 340 with positive refractive power has a concave object-side surface 341 and a convex image-side surface 342, and is made of plastic material. The object-side surface 341 and the image-side surface 342 of the fourth lens element 340 are aspheric.

The fifth lens element 350 with negative refractive power has a convex object-side surface 351 and a concave image-side surface 352, and is made of plastic material. The object-side surface 351 and the image-side surface 352 of the fifth lens element 350 are aspheric. Furthermore, both of the object-side surface 351 and the image-side surface 352 of the fifth lens element 350 have at least one inflection point.

The IR-cut filter 360 is made of glass and located between the fifth lens element 350 and the image plane 370, and will not affect the focal length of the image capturing lens system.

The detailed optical data of the 3rd embodiment are shown in Table 5 and the aspheric surface data are shown in Table 6 below.

TABLE 5

3rd Embodiment
f = 3.45 mm, Fno = 2.05, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.186 | | | | |
| 2 | Lens 1 | 1.724 | ASP | 0.378 | Plastic | 1.544 | 55.9 | 36.23 |
| 3 | | 1.743 | ASP | 0.092 | | | | |
| 4 | Lens 2 | 1.515 | ASP | 0.377 | Plastic | 1.544 | 55.9 | 3.95 |
| 5 | | 4.675 | ASP | 0.349 | | | | |
| 6 | Lens 3 | −4.473 | ASP | 0.405 | Plastic | 1.650 | 21.4 | −5.91 |
| 7 | | 27.970 | ASP | 0.156 | | | | |
| 8 | Lens 4 | −5.362 | ASP | 0.747 | Plastic | 1.535 | 55.7 | 2.15 |
| 9 | | −0.994 | ASP | 0.363 | | | | |

TABLE 5-continued

3rd Embodiment
f = 3.45 mm, Fno = 2.05, HFOV = 39.0 deg.

| Surface # | | Curvature Radius | | Thickness | Material | Index | Abbe # | Focal Length |
|---|---|---|---|---|---|---|---|---|
| 10 | Lens 5 | 2.400 | ASP | 0.332 | Plastic | 1.535 | 55.7 | −2.69 |
| 11 | | 0.855 | ASP | 0.800 | | | | |
| 12 | IR-cut filter | Plano | | 0.200 | Glass | 1.517 | 64.2 | — |
| 13 | | Plano | | 0.402 | | | | |
| 14 | Image | Plano | | — | | | | |

Note:
Reference wavelength is 587.6 nm (d-line).

TABLE 6

Aspheric Coefficients

| Surface # | 2 | 3 | 4 | 5 | 6 |
|---|---|---|---|---|---|
| k = | −9.3744E+00 | −7.1658E+00 | −3.5348E+00 | −1.3963E+01 | 5.0000E+00 |
| A4 = | 1.6007E−01 | −7.6615E−02 | −1.0353E−01 | −7.4883E−02 | −2.2792E−01 |
| A6 = | 4.0760E−04 | −1.6688E−01 | −1.3223E−01 | −1.3289E−01 | −1.7151E−01 |
| A8 = | −7.4151E−01 | 5.3163E−01 | 3.5962E−01 | 5.8826E−02 | 4.6872E−01 |
| A10 = | 2.2773E+00 | −1.3140E+00 | −1.2790E+00 | −5.6454E−01 | −1.0260E+00 |
| A12 = | −3.5597E+00 | 1.3554E+00 | 1.3966E+00 | 9.4579E−01 | 1.8931E+00 |
| A14 = | 2.8616E+00 | −6.0013E−01 | −6.5443E−01 | −5.0657E−01 | −1.5180E+00 |
| A16 = | −9.8280E−01 | 4.8644E−02 | 1.7377E−01 | 1.0009E−01 | 4.3319E−01 |

| Surface # | 7 | 8 | 9 | 10 | 11 |
|---|---|---|---|---|---|
| k = | −3.0000E+01 | 7.2026E−01 | −3.5375E+00 | −2.9236E−01 | −3.8262E+00 |
| A4 = | −1.2805E−01 | 6.1820E−02 | −7.4368E−02 | −2.1542E−01 | −1.3262E−01 |
| A6 = | 2.0400E−01 | 4.0378E−01 | 1.5592E−01 | 8.0204E−02 | 6.3730E−02 |
| A8 = | −7.5453E−01 | −1.2873E+00 | −1.0484E−01 | −2.7439E−02 | −2.4279E−02 |
| A10 = | 1.1443E+00 | 1.6451E+00 | 1.5269E−02 | 7.9186E−03 | 6.0373E−03 |
| A12 = | −7.5090E−01 | −1.0807E+00 | 2.8393E−02 | −1.6123E−03 | −9.6057E−04 |
| A14 = | 2.1057E−01 | 3.5886E−01 | −1.7116E−02 | 2.1098E−04 | 8.8184E−05 |
| A16 = | −1.4115E−02 | −4.7639E−02 | 2.8492E−03 | −1.4392E−05 | −3.5305E−06 |

In the image capturing lens system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| 3rd Embodiment | | | |
|---|---|---|---|
| f [mm] | 3.45 | f2/f1 | 0.11 |
| Fno | 2.05 | f2/R3 | 2.61 |
| HFOV [deg.] | 39.0 | f/f2 | 0.87 |
| V2/V3 | 2.61 | f/f23 | 0.40 |
| T23/CT2 | 0.93 | f3/f2 | −1.50 |
| (R5 + R6)/(R5 − R6) | −0.72 | (f4/f1) + (f4/f2) + \|f4/f3\| | 0.97 |
| (R9 + R10)/(R9 − R10) | 2.11 | | |

4th Embodiment

Figure 4A:
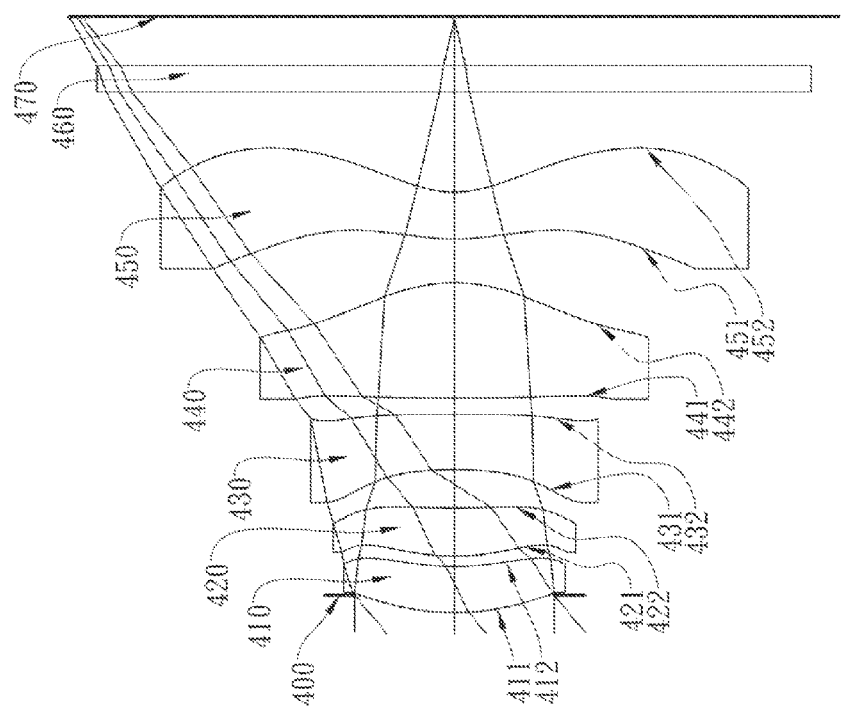
FIG. 4A is a schematic view of an image capturing lens system according to the 4th embodiment of the present disclosure.
Figure 4B:
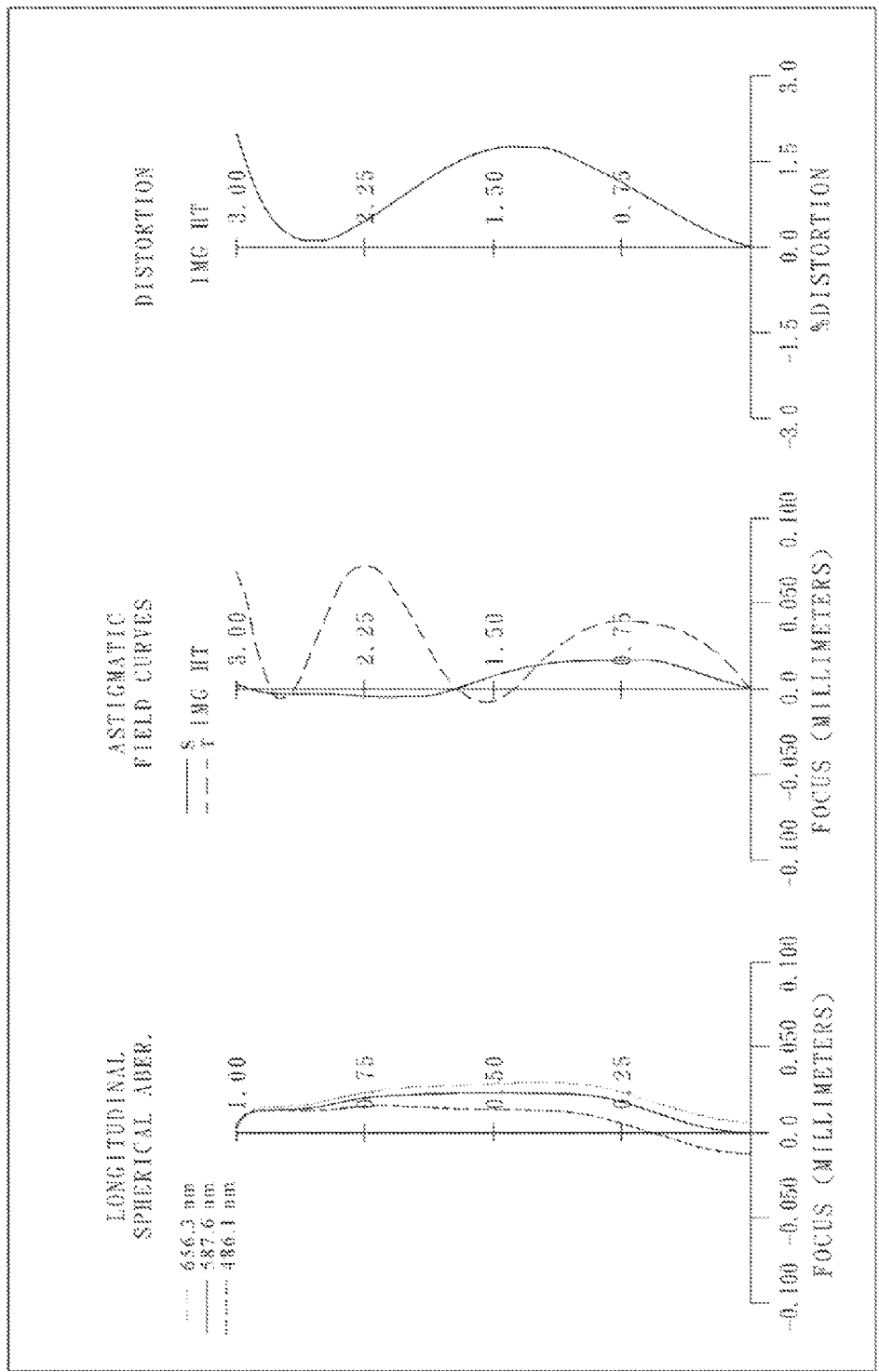
FIG. 4B shows spherical aberration curves, astigmatic field curves and a distortion curve of the image capturing lens system according to the 4th embodiment.

FIG. 4A is a schematic view of an image capturing lens system according to the 4th embodiment of the present disclosure. FIG. 4B shows spherical aberration curves, astigmatic field curves and a distortion curve of the image capturing lens system according to the 4th embodiment. In FIG. 4A, the image capturing lens system includes, in order from an object side to an image side, an aperture stop 400, a first lens element 410, a second lens element 420, a third lens element 430, a fourth lens element 440, a fifth lens element 450, an IR-cut filter 460 and an image plane 470. The image capturing lens system has a total of five lens elements (410-450) with refractive power.

The first lens element 410 with positive refractive power has a convex object-side surface 411 and a concave image-side surface 412, and is made of plastic material. The object-side surface 411 and the image-side surface 412 of the first lens element 410 are aspheric. Furthermore, the image-side surface 412 of the first lens element 410 has at least one inflection point.

The second lens element 420 with positive refractive power has a convex object-side surface 421 and a concave image-side surface 422, and is made of plastic material. The object-side surface 421 and the image-side surface 422 of the second lens element 420 are aspheric.

The third lens element 430 with negative refractive power has a concave object-side surface 431 and a concave image-side surface 432, and is made of plastic material. The object-side surface 431 and the image-side surface 432 of the third lens element 430 are aspheric.

The fourth lens element 440 with positive refractive power has a convex object-side surface 441 and a convex image-side surface 442, and is made of plastic material. The object-side surface 441 and the image-side surface 442 of the fourth lens element 440 are aspheric.

The fifth lens element 450 with negative refractive power has a convex object-side surface 451 and a concave image-side surface 452, and is made of plastic material. The object-side surface 451 and the image-side surface 452 of the fifth lens element 450 are aspheric. Furthermore, both of the object-side surface 451 and the image-side surface 452 of the fifth lens element 450 have at least one inflection point.

The IR-cut filter 460 is made of glass and located between the fifth lens element 450 and the image plane 470, and will not affect the focal length of the image capturing lens system.

The detailed optical data of the 4th embodiment are shown in Table 7 and the aspheric surface data are shown in Table 8 below.

| 4th Embodiment | | | |
|---|---|---|---|
| f [mm] | 3.50 | f2/f1 | 0.15 |
| Fno | 2.20 | f2/R3 | 2.31 |
| HFOV [deg.] | 40.0 | f/f2 | 0.90 |
| V2/V3 | 2.40 | f/f23 | 0.25 |
| T23/CT2 | 0.80 | f3/f2 | −1.15 |
| (R5 + R6)/(R5 − R6) | −0.78 | (f4/f1) + (f4/f2) + |f4/f3| | 1.23 |
| (R9 + R10)/(R9 − R10) | 2.69 | | |

TABLE 7

4th Embodiment
f = 3.50 mm, Fno = 2.20, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.138 | | | | |
| 2 | Lens 1 | 1.876 | ASP | 0.369 | Plastic | 1.535 | 55.7 | 26.30 |
| 3 | | 2.016 | ASP | 0.082 | | | | |
| 4 | Lens 2 | 1.680 | ASP | 0.384 | Plastic | 1.544 | 55.9 | 3.88 |
| 5 | | 7.599 | ASP | 0.307 | | | | |
| 6 | Lens 3 | −3.216 | ASP | 0.439 | Plastic | 1.640 | 23.3 | −4.45 |
| 7 | | 26.366 | ASP | 0.133 | | | | |
| 8 | Lens 4 | 38.780 | ASP | 0.915 | Plastic | 1.544 | 55.9 | 2.37 |
| 9 | | −1.323 | ASP | 0.350 | | | | |
| 10 | Lens 5 | 1.770 | ASP | 0.373 | Plastic | 1.544 | 55.9 | −3.19 |
| 11 | | 0.811 | ASP | 0.800 | | | | |
| 12 | IR-cut filter | Plano | | 0.210 | Glass | 1.517 | 64.2 | — |
| 13 | | Plano | | 0.391 | | | | |
| 14 | Image | Plano | | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k = | −9.7904E+00 | −9.0468E+00 | −3.0347E+00 | −1.5387E+01 | 1.5718E+00 |
| A4 = | 1.3058E−01 | −7.5692E−02 | −1.0292E−01 | −8.2622E−02 | −1.8314E−01 |
| A6 = | −1.5256E−02 | −1.8656E−01 | −1.5828E−01 | −1.5455E−01 | −1.5198E−01 |
| A8 = | −5.5743E−01 | 3.0255E−01 | 2.1321E−01 | 1.3519E−02 | 3.6174E−01 |
| A10 = | 1.5032E+00 | −8.3760E−01 | −8.5420E−01 | −3.7999E−01 | −6.2881E−01 |
| A12 = | −2.1041E+00 | 8.9022E−01 | 7.5425E−01 | 5.6540E−01 | 1.1310E+00 |
| A14 = | 1.5344E+00 | −2.9900E−01 | −3.4386E−01 | −2.1527E−01 | −8.2482E−01 |
| A16 = | −5.5299E−01 | −1.0451E−01 | 2.1420E−01 | 6.2571E−02 | 2.0267E−01 |

| Surface # | 7 | 8 | 9 | 10 | 11 |
|---|---|---|---|---|---|
| k = | −1.0000E+00 | −2.0000E+01 | −2.4573E+00 | −1.8019E+01 | −3.8813E+00 |
| A4 = | −1.4088E−01 | −4.9962E−02 | −1.5521E−02 | −1.4774E−01 | −1.2257E−01 |
| A6 = | 2.0301E−01 | 3.9502E−01 | 1.1358E−01 | 5.7248E−02 | 5.5511E−02 |
| A8 = | −5.2003E−01 | −9.2510E−01 | −7.6652E−02 | −1.6308E−02 | −1.8736E−02 |
| A10 = | 7.3190E−01 | 1.0446E+00 | 9.5869E−03 | 4.3131E−03 | 4.1165E−03 |
| A12 = | −4.4687E−01 | −6.2946E−01 | 1.6472E−02 | −8.3559E−04 | −5.7251E−04 |
| A14 = | 1.0550E−01 | 1.9093E−01 | −8.9702E−03 | 1.0804E−04 | 4.6305E−05 |
| A16 = | −4.8278E−04 | −2.2743E−02 | 1.3590E−03 | −8.7888E−06 | −1.6703E−06 |

In the image capturing lens system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

5th Embodiment

Figure 5A:
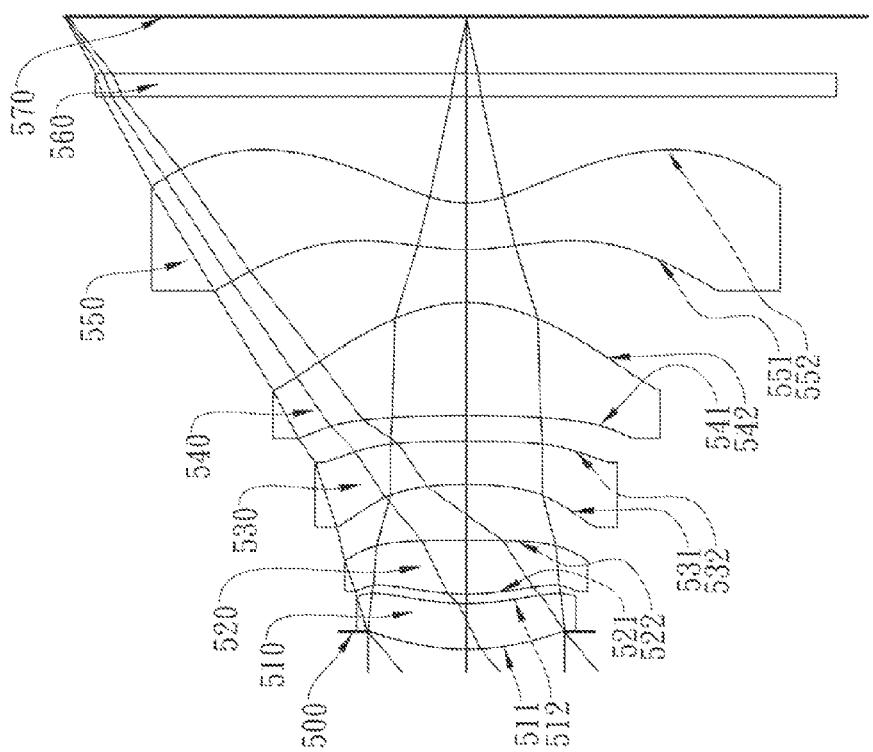
FIG. 5A is a schematic view of an image capturing lens system according to the 5th embodiment of the present disclosure.
Figure 5B:
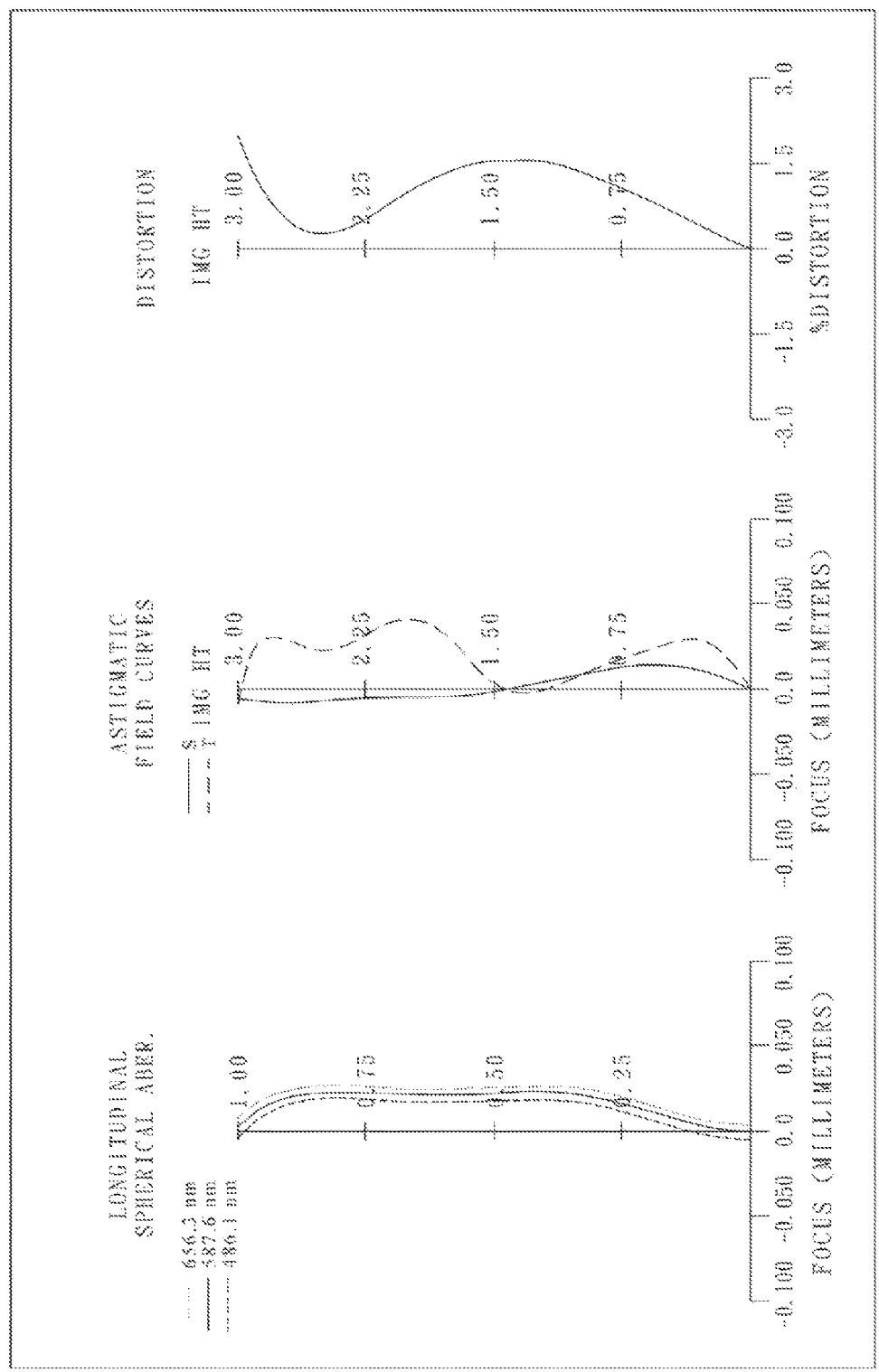
FIG. 5B shows spherical aberration curves, astigmatic field curves and a distortion curve of the image capturing lens system according to the 5th embodiment.

FIG. 5A is a schematic view of an image capturing lens system according to the 5th embodiment of the present disclosure. FIG. 5B shows spherical aberration curves, astigmatic field curves and a distortion curve of the image capturing lens system according to the 5th embodiment. In FIG. 5A, the image capturing lens system includes, in order from an object side to an image side, an aperture stop 500, a first lens element 510, a second lens element 520, a third lens element 530, a fourth lens element 540, a fifth lens element 550, an IR-cut filter 560 and an image plane 570. The image capturing lens system has a total of five lens elements (510-550) with refractive power.

The first lens element 510 with positive refractive power has a convex object-side surface 511 and a concave image-side surface 512, and is made of plastic material. The object-side surface 511 and the image-side surface 512 of the first lens element 510 are aspheric. Furthermore, the image-side surface 512 of the first lens element 510 has at least one inflection point.

The second lens element 520 with positive refractive power has a convex object-side surface 521 and a convex image-side surface 522, and is made of glass material. The object-side surface 521 and the image-side surface 522 of the second lens element 520 are aspheric.

The third lens element 530 with negative refractive power has a concave object-side surface 531 and a concave image-side surface 532, and is made of plastic material. The object-side surface 531 and the image-side surface 532 of the third lens element 530 are aspheric.

The fourth lens element 540 with positive refractive power has a concave object-side surface 541 and a convex image-side surface 542, and is made of plastic material. The object-side surface 541 and the image-side surface 542 of the fourth lens element 540 are aspheric.

The fifth lens element 550 with negative refractive power has a convex object-side surface 551 and a concave image-side surface 552, and is made of plastic material. The object-side surface 551 and the image-side surface 552 of the fifth lens element 550 are aspheric. Furthermore, both of the object-side surface 551 and the image-side surface 552 of the fifth lens element 550 have at least one inflection point.

The IR-cut filter 560 is made of glass and located between the fifth lens element 550 and the image plane 570, and will not affect the focal length of the image capturing lens system.

The detailed optical data of the 5th embodiment are shown in Table 9 and the aspheric surface data are shown in Table 10 below.

TABLE 9

5th Embodiment
f = 3.48 mm, Fno = 2.36, HFOV = 40.1 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.130 |  |  |  |  |
| 2 | Lens 1 | 1.822 | ASP | 0.343 | Plastic | 1.514 | 56.8 | 57.06 |
| 3 |  | 1.818 | ASP | 0.072 |  |  |  |  |
| 4 | Lens 2 | 1.873 | ASP | 0.401 | Glass | 1.486 | 85.2 | 3.79 |
| 5 |  | −102.237 | ASP | 0.421 |  |  |  |  |
| 6 | Lens 3 | −3.290 | ASP | 0.323 | Plastic | 1.633 | 23.4 | −4.99 |
| 7 |  | 80.098 | ASP | 0.196 |  |  |  |  |
| 8 | Lens 4 | −10.992 | ASP | 0.846 | Plastic | 1.544 | 55.9 | 2.24 |
| 9 |  | −1.129 | ASP | 0.397 |  |  |  |  |
| 10 | Lens 5 | 1.732 | ASP | 0.350 | Plastic | 1.514 | 56.8 | −2.89 |
| 11 |  | 0.745 | ASP | 0.800 |  |  |  |  |
| 12 | IR-cut filter | Plano |  | 0.175 | Glass | 1.517 | 64.2 | — |
| 13 |  | Plano |  | 0.427 |  |  |  |  |
| 14 | Image | Plano |  | — |  |  |  |  |

Note:
Reference wavelength is 587.6 nm (d-line).

TABLE 10

Aspheric Coefficients

| Surface # | 2 | 3 | 4 | 5 | 6 |
|---|---|---|---|---|---|
| k = | −8.0622E+00 | −7.8551E+00 | −4.7156E+00 | 5.0000E+01 | 4.4119E+00 |
| A4 = | 9.6757E−02 | −6.0380E−02 | −1.2439E−01 | −1.1557E−01 | −2.4338E−01 |
| A6 = | 2.8910E−02 | −1.9424E−01 | −1.3884E−01 | −1.3933E−01 | −1.6453E−01 |
| A8 = | −6.0389E−01 | 3.1024E−01 | 1.1242E−01 | 9.8773E−02 | 3.5810E−01 |
| A10 = | 1.5325E+00 | −9.1973E−01 | −8.1382E−01 | −4.4307E−01 | −6.1334E−01 |
| A12 = | −2.1041E+00 | 8.9022E−01 | 7.5425E−01 | 5.6433E−01 | 1.1310E+00 |
| A14 = | 1.5344E+00 | −2.9900E−01 | −3.4386E−01 | −2.1527E−01 | −8.2482E−01 |
| A16 = | −5.5299E−01 | −1.0451E−01 | 2.1420E−01 | 6.2571E−02 | 2.0267E−01 |

| Surface # | 7 | 8 | 9 | 10 | 11 |
|---|---|---|---|---|---|
| k = | −1.0000E+00 | 3.2644E+01 | −2.3159E+00 | −2.0000E+01 | −3.6647E+00 |
| A4 = | −2.1353E−01 | −7.0398E−02 | −4.8988E−02 | −1.3904E−01 | −1.1781E−01 |
| A6 = | 2.0616E−01 | 3.8301E−01 | 9.6577E−02 | 4.9289E−02 | 5.3874E−02 |
| A8 = | −5.2517E−01 | −9.1927E−01 | −7.5536E−02 | −1.5950E−02 | −1.8541E−02 |
| A10 = | 7.3211E−01 | 1.0403E+00 | 1.0777E−02 | 4.8340E−03 | 4.1562E−03 |
| A12 = | −4.4861E−01 | −6.3041E−01 | 1.6809E−02 | −8.7335E−04 | −5.8134E−04 |
| A14 = | 1.1022E−01 | 1.9105E−01 | −8.8465E−03 | 6.4566E−05 | 4.5959E−05 |
| A16 = | −4.3787E−04 | −2.1302E−02 | 1.3604E−03 | −5.7839E−07 | −1.5589E−06 |

In the image capturing lens system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| 5th Embodiment | | | |
|---|---|---|---|
| f [mm] | 3.48 | f2/f1 | 0.07 |
| Fno | 2.36 | f2/R3 | 2.02 |
| HFOV [deg.] | 40.1 | f/f2 | 0.92 |
| V2/V3 | 3.64 | f/f23 | 0.35 |
| T23/CT2 | 1.05 | f3/f2 | −1.32 |
| (R5 + R6)/(R5 − R6) | −0.92 | (f4/f1) + (f4/f2) + \|f4/f3\| | 1.08 |
| (R9 + R10)/(R9 − R10) | 2.51 | | |

6th Embodiment

Figure 6A:
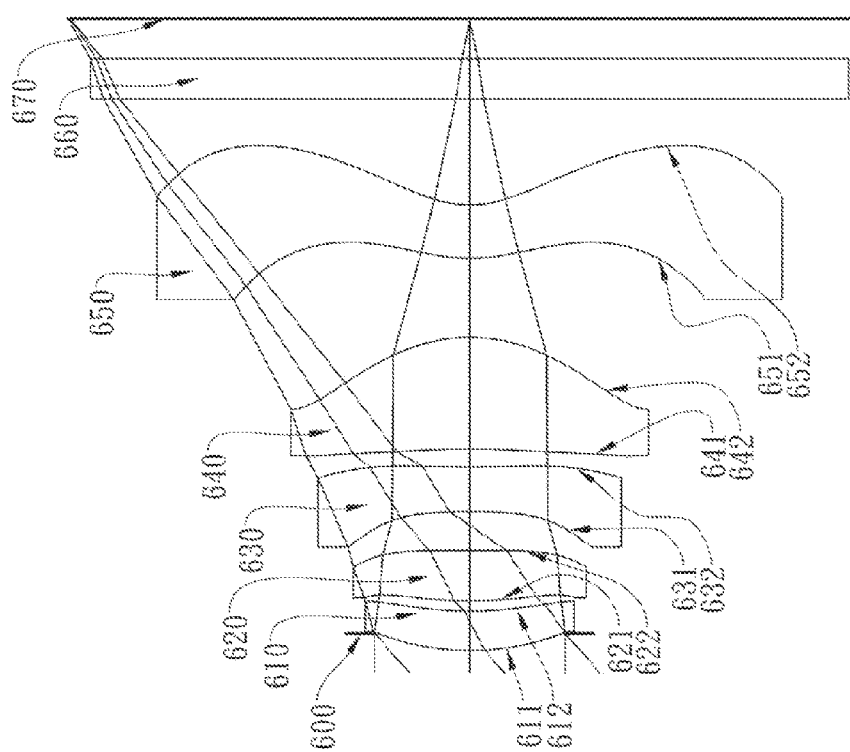
FIG. 6A is a schematic view of an image capturing lens system according to the 6th embodiment of the present disclosure.
Figure 6B:
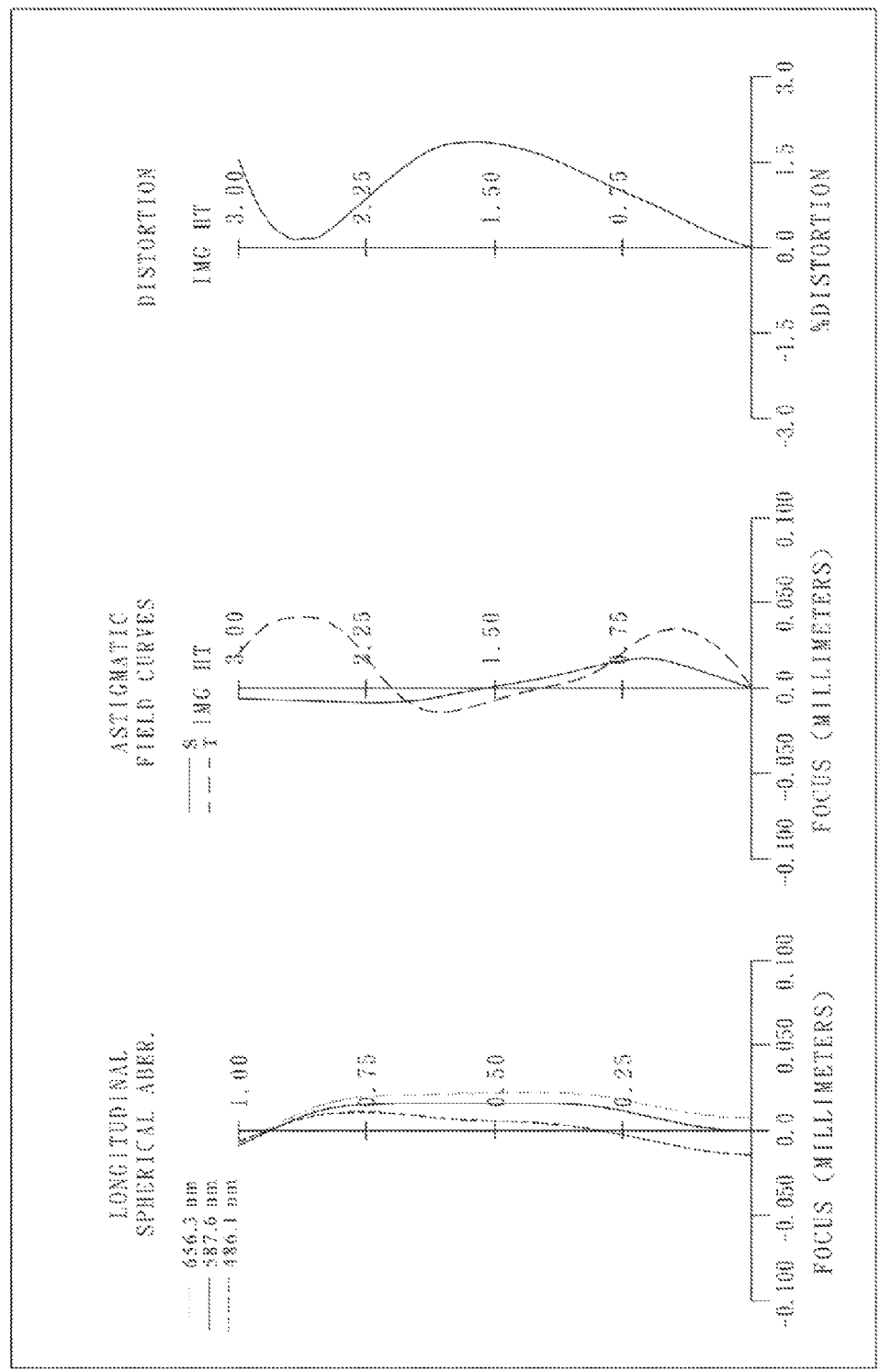
FIG. 6B shows spherical aberration curves, astigmatic field curves and a distortion curve of the image capturing lens system according to the 6th embodiment.

FIG. 6A is a schematic view of an image capturing lens system according to the 6th embodiment of the present disclosure. FIG. 6B shows spherical aberration curves, astigmatic field curves and a distortion curve of the image capturing lens system according to the 6th embodiment. In FIG. 6A, the image capturing lens system includes, in order from an object side to an image side, an aperture stop 600, a first lens element 610, a second lens element 620, a third lens element 630, a fourth lens element 640, a fifth lens element 650, an IR-cut filter 660 and an image plane 670. The image capturing lens system has a total of five lens elements (610-650) with refractive power.

The first lens element 610 with positive refractive power has a convex object-side surface 611 and a concave image-side surface 612, and is made of plastic material. The object-side surface 611 and the image-side surface 612 of the first lens element 610 are aspheric. Furthermore, the image-side surface 612 of the first lens element 610 has at least one inflection point.

The second lens element 620 with positive refractive power has a convex object-side surface 621 and a concave image-side surface 622, and is made of plastic material. The object-side surface 621 and the image-side surface 622 of the second lens element 620 are aspheric.

The third lens element 630 with negative refractive power has a concave object-side surface 631 and a concave image-side surface 632, and is made of plastic material. The object-side surface 631 and the image-side surface 632 of the third lens element 630 are aspheric.

The fourth lens element 640 with positive refractive power has a concave object-side surface 641 and a convex image-side surface 642, and is made of plastic material. The object-side surface 641 and the image-side surface 642 of the fourth lens element 640 are aspheric.

The fifth lens element 650 with negative refractive power has a convex object-side surface 651 and a concave image-side surface 652, and is made of plastic material. The object-side surface 651 and the image-side surface 652 of the fifth lens element 650 are aspheric. Furthermore, both of the object-side surface 651 and the image-side surface 652 of the fifth lens element 650 have at least one inflection point.

The IR-cut filter 660 is made of glass and located between the fifth lens element 650 and the image plane 670, and will not affect the focal length of the image capturing lens system.

The detailed optical data of the 6th embodiment are shown in Table 11 and the aspheric surface data are shown in Table 12 below.

TABLE 11

6th Embodiment
f = 3.38 mm, Fno = 2.36, HFOV = 41.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.130 | | | | |
| 2 | Lens 1 | 1.929 | ASP | 0.296 | Plastic | 1.514 | 56.8 | 13.66 |
| 3 | | 2.521 | ASP | 0.077 | | | | |
| 4 | Lens 2 | 2.708 | ASP | 0.379 | Plastic | 1.544 | 55.9 | 5.47 |
| 5 | | 28.533 | ASP | 0.293 | | | | |
| 6 | Lens 3 | −6.290 | ASP | 0.337 | Plastic | 1.633 | 23.4 | −5.23 |
| 7 | | 7.126 | ASP | 0.133 | | | | |
| 8 | Lens 4 | −7.577 | ASP | 0.843 | Plastic | 1.514 | 56.8 | 2.80 |
| 9 | | −1.253 | ASP | 0.592 | | | | |
| 10 | Lens 5 | 1.269 | ASP | 0.400 | Plastic | 1.514 | 56.8 | −4.69 |
| 11 | | 0.742 | ASP | 0.800 | | | | |
| 12 | IR-cut filter | Plano | | 0.300 | Glass | 1.517 | 64.2 | — |
| 13 | | Plano | | 0.303 | | | | |
| 14 | Image | Plano | | — | | | | |

Note:
Reference wavelength is 587.6 nm (d-line).

TABLE 12

| Aspheric Coefficients | | | | | |
|---|---|---|---|---|---|
| Surface # | 2 | 3 | 4 | 5 | 6 |
| k = | −7.5156E+00 | −1.0693E+01 | −7.5966E+00 | 4.3846E+01 | 1.7476E+01 |
| A4 = | 1.0697E−01 | −3.2364E−02 | −1.2205E−01 | −1.8418E−01 | −2.9925E−01 |
| A6 = | 7.8741E−02 | −6.1028E−02 | −7.1201E−02 | −8.7770E−02 | −1.9139E−01 |
| A8 = | −6.0130E−01 | 3.1310E−01 | 1.8983E−01 | 8.8923E−02 | 4.4511E−01 |

TABLE 12-continued

| Aspheric Coefficients | | | | | |
|---|---|---|---|---|---|
| A10 = | 1.5363E+00 | −9.3382E−01 | −8.0438E−01 | −4.0714E−01 | −6.9838E−01 |
| A12 = | −2.1124E+00 | 8.8371E−01 | 7.4656E−01 | 5.6477E−01 | 1.1314E+00 |
| A14 = | 1.5344E+00 | −2.9896E−01 | −3.4389E−01 | −2.1888E−01 | −8.2452E−01 |
| A16 = | −5.5299E−01 | −1.0450E−01 | 2.1420E−01 | 6.2591E−02 | 2.0061E−01 |

| Surface # | 7 | 8 | 9 | 10 | 11 |
|---|---|---|---|---|---|
| k = | −1.0000E+00 | −2.0000E+01 | −1.2515E+00 | −7.5583E+00 | −3.1794E+00 |
| A4 = | −1.8561E−01 | −3.1201E−02 | −6.3087E−02 | −1.7158E−01 | −1.1868E−01 |
| A6 = | 2.3530E−01 | 3.8642E−01 | 1.0839E−01 | 6.4047E−02 | 5.4197E−02 |
| A8 = | −5.3613E−01 | −9.1264E−01 | −6.8973E−02 | −2.0203E−02 | −1.8574E−02 |
| A10 = | 7.1665E−01 | 1.0397E+00 | 1.3160E−02 | 4.5454E−03 | 4.1171E−03 |
| A12 = | −4.5672E−01 | −6.3023E−01 | 1.7293E−02 | −7.8965E−04 | −5.7695E−04 |
| A14 = | 1.1016E−01 | 1.9133E−01 | −8.8514E−03 | 7.7410E−05 | 4.4130E−05 |
| A16 = | 6.7372E−04 | −2.1824E−02 | 1.2071E−03 | −2.8431E−06 | −1.3284E−06 |

In the image capturing lens system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| 6th Embodiment | | | |
|---|---|---|---|
| f [mm] | 3.38 | f2/f1 | 0.40 |
| Fno | 2.36 | f2/R3 | 2.02 |
| HFOV [deg.] | 41.1 | f/f2 | 0.62 |
| V2/V3 | 2.39 | f/f23 | 0.05 |
| T23/CT2 | 0.77 | f3/f2 | −0.96 |
| (R5 + R6)/(R5 − R6) | −0.06 | (f4/f1) + (f4/f2) + |f4/f3| | 1.25 |
| (R9 + R10)/(R9 − R10) | 3.82 | | |

7th Embodiment

Figure 7B:
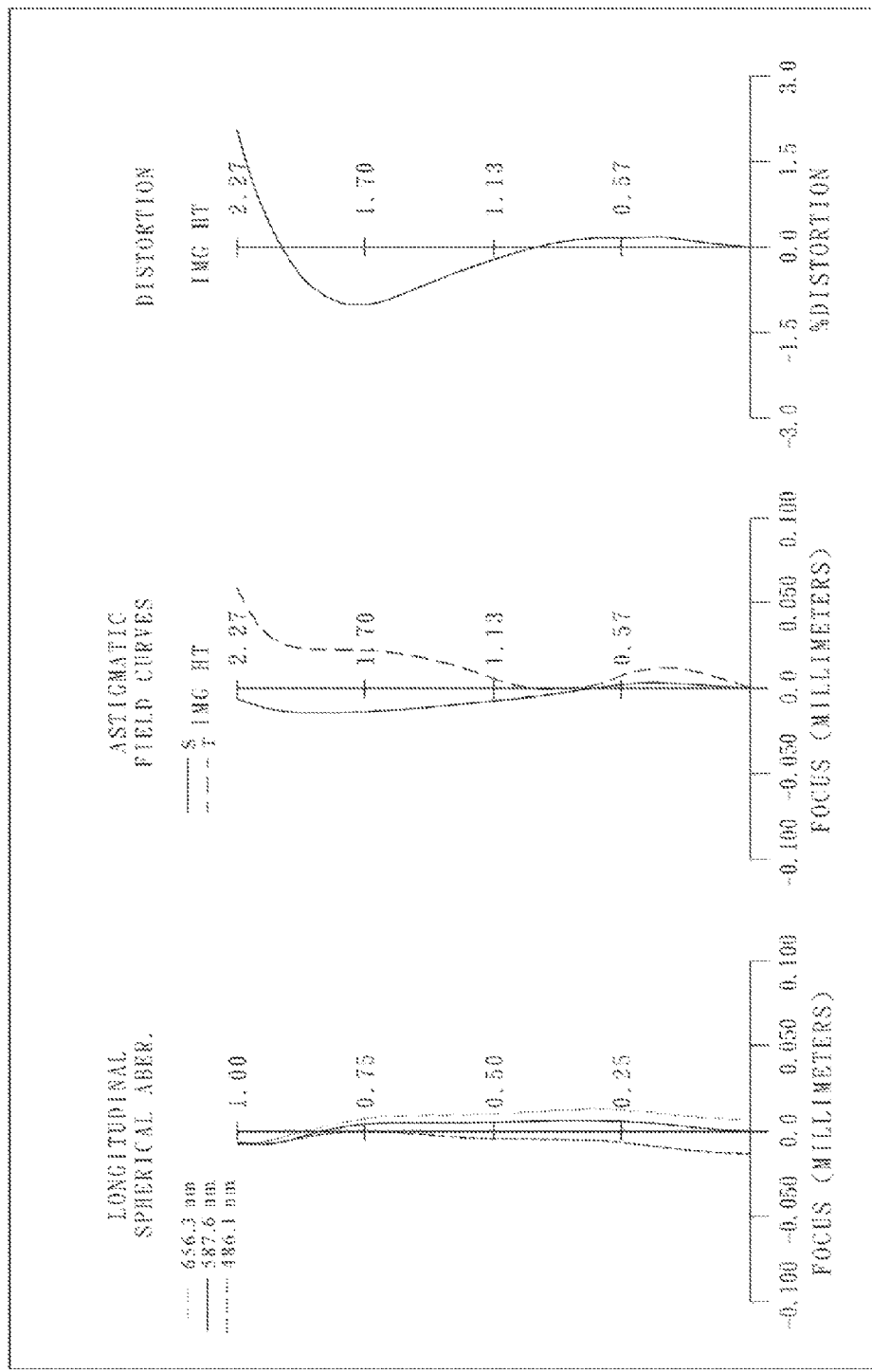
FIG. 7B shows spherical aberration curves, astigmatic field curves and a distortion curve of the image capturing lens system according to the 7th embodiment.

FIG. 7A is a schematic view of an image capturing lens system according to the 7th embodiment of the present disclosure. FIG. 7B shows spherical aberration curves, astigmatic field curves and a distortion curve of the image capturing lens system according to the 7th embodiment. In FIG. 7A, the image capturing lens system includes, in order from an object side to an image side, a first lens element 710, an aperture stop 700, a second lens element 720, a third lens element 730, a fourth lens element 740, a fifth lens element 750, an IR-cut filter 760 and an image plane 770. The image capturing lens system has a total of five lens elements (710-750) with refractive power.

The first lens element 710 with positive refractive power has a convex object-side surface 711 and a concave image-side surface 712, and is made of plastic material. The object-side surface 711 and the image-side surface 712 of the first lens element 710 are aspheric. Furthermore, the image-side surface 712 of the first lens element 710 has at least one inflection point.

The second lens element 720 with positive refractive power has a convex object-side surface 721 and a concave image-side surface 722, and is made of plastic material. The object-side surface 721 and the image-side surface 722 of the second lens element 720 are aspheric.

The third lens element 730 with negative refractive power has a concave object-side surface 731 and a concave image-side surface 732, and is made of plastic material. The object-side surface 731 and the image-side surface 732 of the third lens element 730 are aspheric.

The fourth lens element 740 with positive refractive power has a concave object-side surface 741 and a convex image-side surface 742, and is made of plastic material. The object-side surface 741 and the image-side surface 742 of the fourth lens element 740 are aspheric.

The fifth lens element 750 with negative refractive power has a convex object-side surface 751 and a concave image-side surface 752, and is made of plastic material. The object-side surface 751 and the image-side surface 752 of the fifth lens element 750 are aspheric. Furthermore, both of the object-side surface 751 and the image-side surface 752 of the fifth lens element 750 have at least one inflection point.

The IR-cut filter 760 is made of glass and located between the fifth lens element 750 and the image plane 770, and will not affect the focal length of the image capturing lens system.

The detailed optical data of the 7th embodiment are shown in Table 13 and the aspheric surface data are shown in Table 14 below.

TABLE 13

7th Embodiment
f = 2.82 mm, Fno = 2.23, HFOV = 38.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.843 | ASP | 0.311 | Plastic | 1.514 | 56.8 | 140.84 |
| 2 | | 1.783 | ASP | 0.069 | | | | |
| 3 | Ape. Stop | Plano | | 0.032 | | | | |
| 4 | Lens 2 | 1.625 | ASP | 0.380 | Plastic | 1.544 | 55.9 | 3.29 |
| 5 | | 16.013 | ASP | 0.293 | | | | |
| 6 | Lens 3 | −3.319 | ASP | 0.318 | Plastic | 1.639 | 23.5 | −4.56 |
| 7 | | 24.850 | ASP | 0.078 | | | | |
| 8 | Lens 4 | −2.857 | ASP | 0.867 | Plastic | 1.514 | 56.8 | 1.69 |

TABLE 13-continued

7th Embodiment
f = 2.82 mm, Fno = 2.23, HFOV = 38.2 deg.

| Surface # | | Curvature Radius | | Thickness | Material | Index | Abbe # | Focal Length |
|---|---|---|---|---|---|---|---|---|
| 9 | | −0.734 | ASP | 0.231 | | | | |
| 10 | Lens 5 | 1.555 | ASP | 0.352 | Plastic | 1.542 | 41.8 | −2.47 |
| 11 | | 0.662 | ASP | 0.700 | | | | |
| 12 | IR-cut filter | Plano | | 0.210 | Glass | 1.517 | 64.2 | — |
| 13 | | Plano | | 0.460 | | | | |
| 14 | Image | Plano | | — | | | | |

Note:
Reference wavelength is 587.6 nm (d-line).

TABLE 14

Aspheric Coefficients

| Surface # | 1 | 2 | 4 | 5 | 6 |
|---|---|---|---|---|---|
| k = | −1.2943E+01 | −9.7245E+00 | −6.7286E+00 | 4.9976E+00 | 4.9089E+00 |
| A4 = | 1.6464E−01 | −1.6063E−01 | −1.7254E−01 | −2.4961E−01 | −3.9911E−01 |
| A6 = | 1.3533E−02 | −1.7625E−01 | −3.3686E−01 | −2.7965E−01 | −6.3042E−01 |
| A8 = | −1.5575E+00 | 9.9890E−01 | 7.6936E−01 | 6.1107E−02 | 1.3675E+00 |
| A10 = | 6.7520E+00 | −3.8559E+00 | −3.6923E+00 | −1.1995E+00 | −3.2190E+00 |
| A12 = | −1.4938E+01 | 5.9804E+00 | 6.3774E+00 | 3.9247E+00 | 8.1078E+00 |
| A14 = | 1.6594E+01 | −3.3622E+00 | −3.9674E+00 | −3.4697E+00 | −8.3968E+00 |
| A16 = | −7.4600E+00 | 3.6972E−01 | 6.7045E−01 | 1.1245E+00 | 3.1096E+00 |

| Surface # | 7 | 8 | 9 | 10 | 11 |
|---|---|---|---|---|---|
| k = | −2.3670E+01 | −4.9061E+00 | −3.1243E+00 | −4.5274E−01 | −3.4531E+00 |
| A4 = | −1.4002E−01 | 1.2448E−01 | −2.9114E−01 | −3.3285E−01 | −1.7072E−01 |
| A6 = | 4.0551E−01 | 6.9127E−01 | 3.1123E−01 | 1.7854E−01 | 1.1118E−01 |
| A8 = | −2.0744E+00 | −3.2389E+00 | −2.4032E−01 | −8.1438E−02 | −5.7636E−02 |
| A10 = | 3.8167E+00 | 5.6032E+00 | 7.1085E−02 | 2.7500E−02 | 2.0164E−02 |
| A12 = | −3.2486E+00 | −4.7949E+00 | 1.3609E−01 | −7.0051E−03 | −4.4314E−03 |
| A14 = | 1.2765E+00 | 2.0710E+00 | −9.5659E−02 | 1.1830E−03 | 5.3688E−04 |
| A16 = | −1.6501E−01 | −3.6334E−01 | 1.4495E−02 | −1.0783E−04 | −2.5912E−05 |

In the image capturing lens system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| 7th Embodiment | | | |
|---|---|---|---|
| f [mm] | 2.82 | f2/f1 | 0.02 |
| Fno | 2.23 | f2/R3 | 2.02 |
| HFOV [deg.] | 38.2 | f/f2 | 0.86 |
| V2/V3 | 2.38 | f/f23 | 0.35 |
| T23/CT2 | 0.77 | f3/f2 | −1.39 |
| (R5 + R6)/(R5 − R6) | −0.76 | (f4/f1) + (f4/f2) + |f4/f3| | 0.90 |
| (R9 + R10)/(R9 − R10) | 2.48 | | |

It is to be noted that TABLES 1-14 show different data of the different embodiments; however, the data of the different embodiments are obtained from experiments. Therefore, any optical system of the same structure is considered to be less than or equal to the scope of the present disclosure even if it uses different data. The embodiments depicted above and the appended drawings are exemplary and are not intended to limit the scope of the present disclosure.

What is claimed is:

1. An image capturing lens system comprising, in order from an object side to an image side:
   a first lens element having positive refractive power;
   a second lens element with positive refractive power having a convex object-side surface;
   a third lens element having negative refractive power;
   a fourth lens element with positive refractive power having a convex image-side surface; and
   a fifth lens element with negative refractive power having a concave image-side surface, wherein both of an object-side surface and the image-side surface of the fifth lens element are aspheric, and at least one inflection point is formed on at least one of the object-side surface and the image-side surface of the fifth lens element;
   wherein the image capturing lens system has a total of five lens elements with refractive power, an axial distance between the second lens element and the third lens element is T23, a central thickness of the second lens element is CT2, a focal length of the second lens element is f2, a curvature radius of the object-side surface of the second lens element is R3, a curvature radius of the object-side surface of the fifth lens element is R9, a curvature radius of the image-side surface of the fifth lens element is R10, and the following relationships are satisfied:

$0.75 < T23/CT2 < 3.0;$ $2.0 < f2/R3 < 15.0;$ and $0 < (R9+R10)/(R9−R10).$

2. The image capturing lens system of claim 1, wherein the first lens element has a convex object-side surface.

3. The image capturing lens system of claim 2, wherein a focal length of the third lens element is f3, the focal length of the second lens element is f2, and the following relationship is satisfied:

$$-1.50<f3/f2<-0.70.$$

4. The image capturing lens system of claim 2, wherein a focal length of the first lens element is f1, the focal length of the second lens element is f2, and the following relationship is satisfied:

$$0<f2/f1<0.90.$$

5. The image capturing lens system of claim 4, wherein the curvature radius of the object-side surface of the fifth lens element is R9, the curvature radius of the image-side surface of the fifth lens element is R10, and the following relationship is satisfied:

$$0.8<(R9+R10)/(R9-R10)<5.0.$$

6. The image capturing lens system of claim 4, wherein a focal length of the image capturing lens system is f, a composite focal length of the second lens element and the third lens element is f23, and the following relationship is satisfied:

$$0<f/f23<0.5.$$

7. The image capturing lens system of claim 4, wherein the first lens element has a concave image-side surface and at least one inflection point is formed on the image-side surface of the first lens element.

8. The image capturing lens system of claim 2, wherein the second lens element has a concave image-side surface.

9. The image capturing lens system of claim 8, wherein a focal length of the first lens element is f1, the focal length of the second lens element is f2, a focal length of the third lens element is f3, a focal length of the fourth lens element is f4, and the following relationship is satisfied:

$$0.75<(f4/f1)+(f4/f2)+|f4/f3|<1.5.$$

10. The image capturing lens system of claim 8, wherein the axial distance between the second lens element and the third lens element is T23, the central thickness of the second lens element is CT2, and the following relationship is satisfied:

$$0.75<T23/CT2<1.5.$$

11. The image capturing lens system of claim 8, wherein a curvature radius of the object-side surface of the third lens element is R5, a curvature radius of the image-side surface of the third lens element is R6, and the following relationship is satisfied:

$$-2.5<(R5+R6)/(R5-R6)<0.5.$$

12. The image capturing lens system of claim 2, wherein the object-side surface of the fifth lens element is convex.

13. The image capturing lens system of claim 12, wherein the third lens element has a concave object-side surface.

14. The image capturing lens system of claim 12, wherein the focal length of the second lens element is f2, the curvature radius of the object-side surface of the second lens element is R3, and the following relationship is satisfied:

$$2.0<f2/R3<5.0.$$

15. The image capturing lens system of claim 12, wherein an Abbe number of the second lens element is V2, an Abbe number of the third lens element is V3, and the following relationship is satisfied:

$$1.5<V2/V3<3.0.$$

16. An image capturing lens system comprising, in order from an object side to an image side:
    a first lens element with positive refractive power having a convex object-side surface;
    a second lens element with positive refractive power having a convex object-side surface;
    a third lens element having negative refractive power;
    a fourth lens element with positive refractive power having a concave object-side surface and a convex image-side surface; and
    a fifth lens element with negative refractive power having a concave image-side surface, wherein both of an object-side surface and the image-side surface of the fifth lens element are aspheric, and at least one inflection point is formed on at least one of the object-side surface and the image-side surface of the fifth lens element;
    wherein the image capturing lens system has a total of five lens elements with refractive power, an axial distance between the second lens element and the third lens element is T23, a central thickness of the second lens element is CT2, a focal length of the second lens element is f2, a curvature radius of the object-side surface of the second lens element is R3, and the following relationships are satisfied:

$$0.75<T23/CT2<3.0; \text{ and}$$

$$2.0<f2/R3.$$

17. The image capturing lens system of claim 16, wherein a focal length of the image capturing lens system is f, a composite focal length of the second lens element and the third lens element is f23, and the following relationship is satisfied:

$$0<f/f23<0.5.$$

18. The image capturing lens system of claim 16, wherein the second lens element has a concave image-side surface.

19. The image capturing lens system of claim 16, wherein a focal length of the image capturing lens system is f, the focal length of the second lens element is f2, and the following relationship is satisfied:

$$0.5<f/f2<1.0.$$

20. The image capturing lens system of claim 16, wherein a curvature radius of the object-side surface of the third lens element is R5, a curvature radius of the image-side surface of the third lens element is R6, and the following relationship is satisfied:

$$-2.5<(R5+R6)/(R5-R6)<0.5.$$

21. The image capturing lens system of claim 16, wherein the first lens element has a concave image-side surface and at least one inflection point is formed on the image-side surface of the first lens element.

22. The image capturing lens system of claim 16, wherein the object-side surface of the fifth lens element is convex.

23. The image capturing lens system of claim 22, wherein a focal length of the first lens element is f1, the focal length of the second lens element is f2, a focal length of the third lens element is f3, a focal length of the fourth lens element is f4, and the following relationship is satisfied:

$$0.75<(f4/f1)+(f4/f2)+|f4/f3|<1.5.$$

* * * * *